(12) United States Patent
Mangutov et al.

(10) Patent No.: US 10,546,349 B2
(45) Date of Patent: Jan. 28, 2020

(54) METHODS AND SYSTEMS TO EMPLOY AGGREGATED ORDER QUANTITY MODIFICATION STRATEGIES

(71) Applicant: TRADING TECHNOLOGIES INTERNATIONAL INC., Chicago, IL (US)

(72) Inventors: Iliar Mangutov, Hinsdale, IL (US); Sanju Varghese, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 345 days.

(21) Appl. No.: 14/984,327

(22) Filed: Dec. 30, 2015

(65) Prior Publication Data
US 2017/0193600 A1 Jul. 6, 2017

(51) Int. Cl.
*G06Q 40/04* (2012.01)
(52) U.S. Cl.
CPC .................... *G06Q 40/04* (2013.01)
(58) Field of Classification Search
CPC .................................... G06Q 40/04

USPC ...................................... 705/35, 37
See application file for complete search history.

(56) References Cited

U.S. PATENT DOCUMENTS

| 7,552,083 B2 * | 6/2009 | Carone | G06Q 30/08 |
| | | | 705/35 |
| 7,809,628 B1 * | 10/2010 | West | G06Q 40/04 |
| | | | 705/37 |
| 8,533,104 B2 | 9/2013 | Cheng et al. | |

* cited by examiner

*Primary Examiner* — Hao Fu
(74) *Attorney, Agent, or Firm* — McDonnell Boehnen Hulbert & Berghoff LLP

(57) ABSTRACT

The disclosed embodiments provide an order balancing tool for modifying one or more components of an aggregated order in response to a change in quantity of the aggregated order. As used herein, the phrase "aggregated order" refers to two or more trade orders for a same tradeable object at a same price that may be distributed between two or more electronic exchanges. Aggregating trade order quantities may be useful, for example, for trading groups to improve the likelihood of the total number of contracts being filled by placing one trade order rather than two separate trade orders that may be separated by additional trade orders received from different accounts.

17 Claims, 15 Drawing Sheets

US 10,546,349 B2

METHODS AND SYSTEMS TO EMPLOY AGGREGATED ORDER QUANTITY MODIFICATION STRATEGIES

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

A trader may route or place a trade order with an exchange. The total quantity of the trade order may be referred to as a total order quantity or a trade order quantity. The trade order quantity is an amount of a tradeable object specified in the corresponding trade order. The trade order quantity may be divided and routed to more than one exchange.

BRIEF DESCRIPTION OF THE FIGURES

Certain embodiments are disclosed with reference to the following drawings.

DETAILED DESCRIPTION

Figure 1:
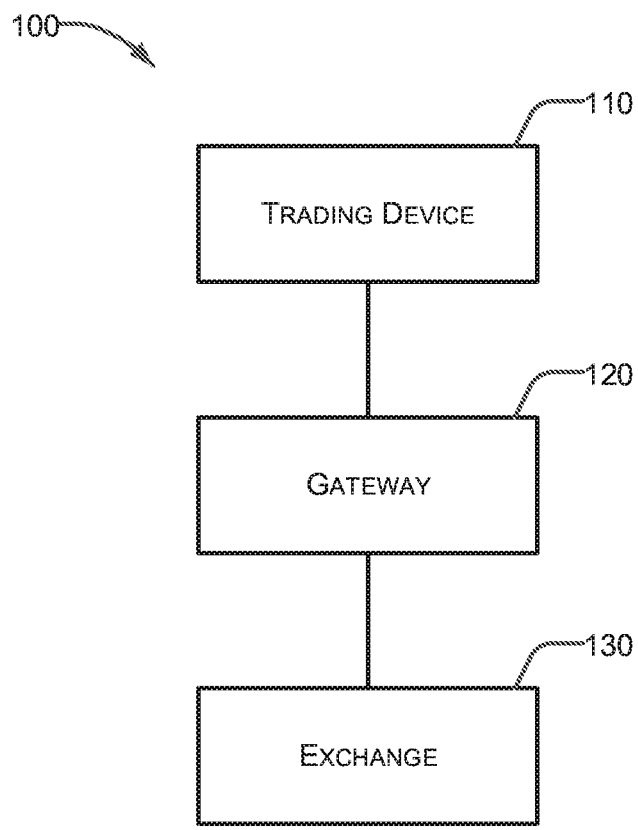
FIG. 1 illustrates a block diagram representative of an example electronic trading system in which certain embodiments may be employed.

This patent relates generally to electronic trading and, more particularly, to methods and systems to employ aggregated order quality modification strategies.

The disclosed embodiments provide an order balancing tool for modifying one or more components of an aggregated order in response to a change in quantity of the aggregated order. For example, the order balancing tool may collect a first trade order for 50 contracts at $80 and a second trade order for 75 contracts at $80 and transmit an aggregated order for 125 contacts at $80. Aggregating trade order quantities may be useful, for example, for trading groups to improve the likelihood of the total number of contracts being filled by placing one trade order rather than two separate trade orders that may be separated by additional trade orders received from different accounts. In some instances, the action of modifying an aggregated order quantity (e.g., increasing the quantity in an initial trade order or decreasing the quantity in an initial trade order) provides an opportunity for re-allocating quantities between different components of the aggregated order (e.g., the child orders) in an advantageous manner.

Allocating and/or re-allocating quantities between different components of a aggregated order may, for example, include allocating orders between different exchanges, between different spread products (e.g., a synthetic spread and an exchange traded spread), and/or different future contracts for a tradeable object having different expirations. For example, multiple exchanges may be enlisted to fill an aggregated order. For example, to fill a trade order of a certain quantity for a certain tradeable object, a first portion of the aggregated order quantity may be routed to a first electronic exchange and a second portion of the aggregated order quantity may be routed to a second exchange. To route the first portion and the second portion of the quantity to the first and second exchanges, respectively, the initial aggregated order (sometimes referred to herein as a "parent trade order" or "parent order") is split into a first trade order representing the first portion (sometimes referred to herein as a "child trade order," "child order," or a "component") and a second trade order representing the second portion. This routing of a portion of the aggregated order quantity to an exchange may alternatively be referred to as routing a component of the aggregated order to the exchange. As discussed herein, when a component is sent to an exchange, the component may alternatively be referred to as a "working" order until the order is filled or the order is cancelled. In some instances when a partial fill has occurred, the component will include a filled quantity and a working quantity, the sum of which represents the aggregated order quantity. In addition to routing components of the aggregated order to multiple exchanges, a component may be routed to more than one broker. Methods, systems and apparatus to facilitate multi-broker routing are described in, for example, U.S. patent application Ser. No. 13/269,061, now U.S. Pat. No. 8,533,104, by Trading Technologies International, Inc., entitled "Multi-Broker Routing Based on Net Position," which is hereby incorporated by reference in its entirety.

In some instances, a request to modify an initial trade order quantity and, thereby, the aggregated order quantity, may be received at the order balancing tool after the exchanges have accepted their working orders. For example, the order balancing tool may receive a request to increase or decrease the first trade order quantity (e.g., 50 contracts) relative to the initial trade order quantity after two or more exchanges have received their working orders. As a result, one or more of the exchanges need to be provided updated (or new) component quantities to fulfill the desired position.

The embodiments disclosed herein provide tools to enable trading systems, devices and/or processes to modify aggregated order quantities. In particular, example embodiments disclosed herein may advantageously re-allocate component quantities between different exchanges based on allocation percentages. For example, certain embodiments disclosed herein facilitate the order balancing tool to adjust the component quantities at the respective exchanges to maintain a fixed percentage allocation.

Certain embodiments disclosed herein may advantageously re-allocate component quantities between different exchanges based on position-in-queue optimization. For example, certain embodiments consider an aggregate position-in-queue of the aggregated order based on the position-in-queue of the components at each of the allocated exchanges when re-allocating the component quantities.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments provide a method including allocating, using a processor, a first component quantity to a first electronic exchange based on an initial aggregated order quantity and a first allocation percentage associated with the first electronic exchange and allocating a second component quantity to a second electronic exchange based on the initial aggregated order quantity and a second allocation percentage associated with the second electronic exchange, and, in response to a request to modify a trade order quantity associated with the tradeable object, calculating an updated aggregated order quantity based on the initial aggregated order quantity and the trade order quantity. The example method also includes obtaining first market data representing a quantity of the first component quantity filled by the first electronic exchange and second market data representing a quantity of the second component quantity filled by the second electronic exchange. The example method also includes calculating an updated first component quantity based on the updated aggregated order quantity, the first allocation percentage and the first market data and an updated second component quantity based on the updated aggregated order quantity, the second allocation percentage and the second market data.

Certain embodiments provide a computing device, including a processor, to execute a trade order in a trading system including a plurality of electronic exchanges. The example computing device is to allocate a first component quantity to a first electronic exchange based on an initial aggregated order quantity and a first allocation percentage associated with the first electronic exchange and allocate a second component quantity to a second electronic exchange based on the initial aggregated order quantity and a second allocation percentage associated with the second electronic exchange. The example computing device is to, in response to a request to modify a trade order quantity associated with the tradeable object, calculate an updated aggregated order quantity based on the initial aggregated order quantity and the trade order quantity. The example computing device is to obtain first market data representative of a quantity of the first component quantity filled by the first electronic exchange and second market data representative of a quantity of the second component quantity filled by the second electronic exchange. The example computing device is to calculate an updated first component quantity based on the updated aggregated order quantity, the first allocation percentage and the first market data and an updated second component quantity based on the updated aggregated order quantity, the second allocation percentage and the second market data.

Certain embodiments provide a tangible computer-readable storage medium comprising instructions that, when executed, cause a computing device to at least allocate a first component quantity to a first electronic exchange based on an initial aggregated order quantity and a first allocation percentage associated with the first electronic exchange and allocate a second component quantity to a second electronic exchange based on the initial aggregated order quantity and a second allocation percentage associated with the second electronic exchange. In response to a request to modify a trade order quantity associated with the tradeable object, the instructions cause the computing device to calculate an updated aggregated order quantity based on the initial aggregated order quantity and the trade order quantity. The example instructions also cause the computing device to obtain first market data representative of a quantity of the first component quantity filled by the first electronic exchange and second market data representative of a quantity of the second component quantity filled by the second electronic exchange. The example instructions also cause the computing device to calculate an updated first component quantity based on the updated aggregated order quantity, the first allocation percentage and the first market data and an updated second component quantity based on the updated aggregated order quantity, the second allocation percentage and the second market data.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer)

in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTO SPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
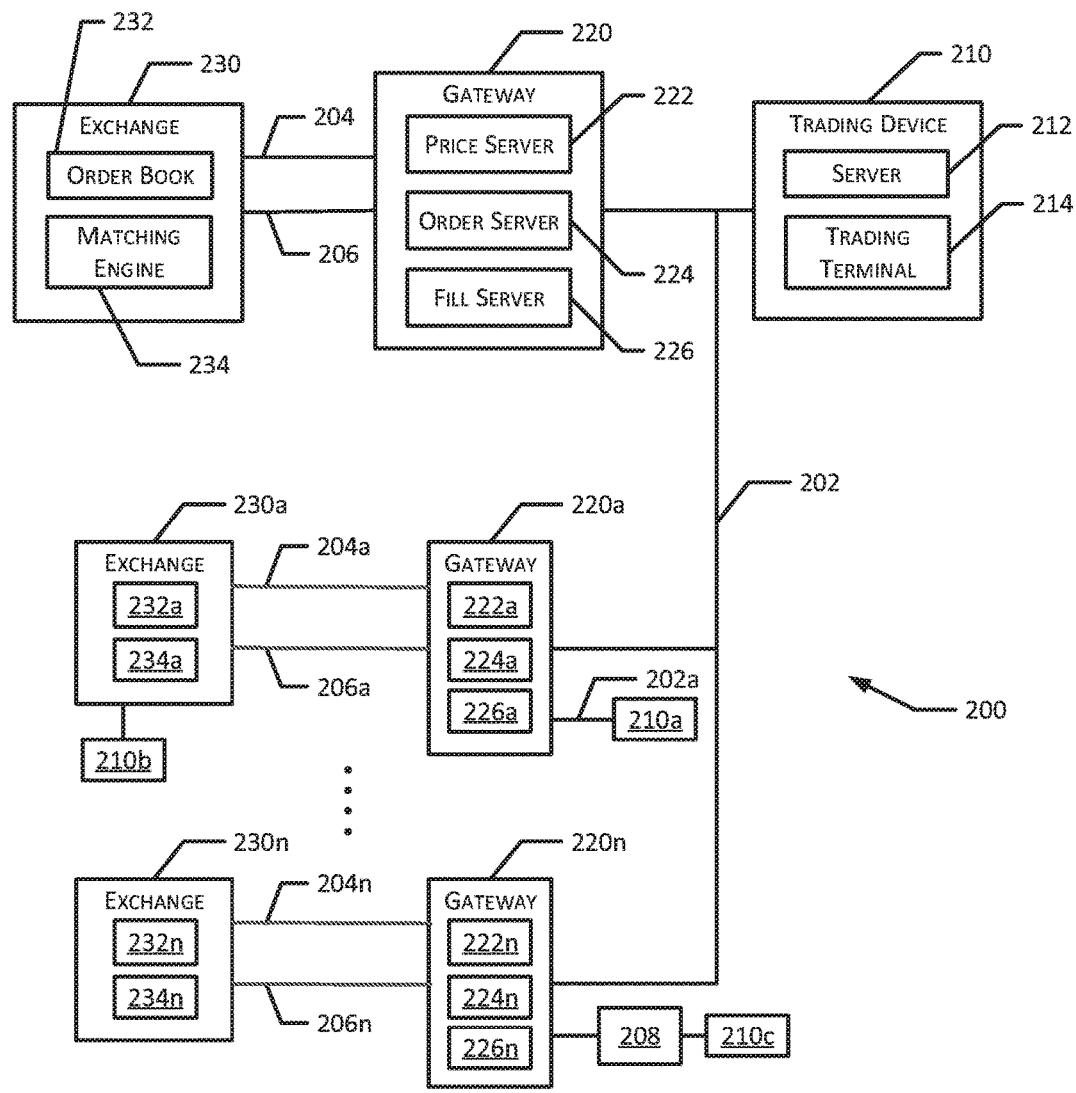
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
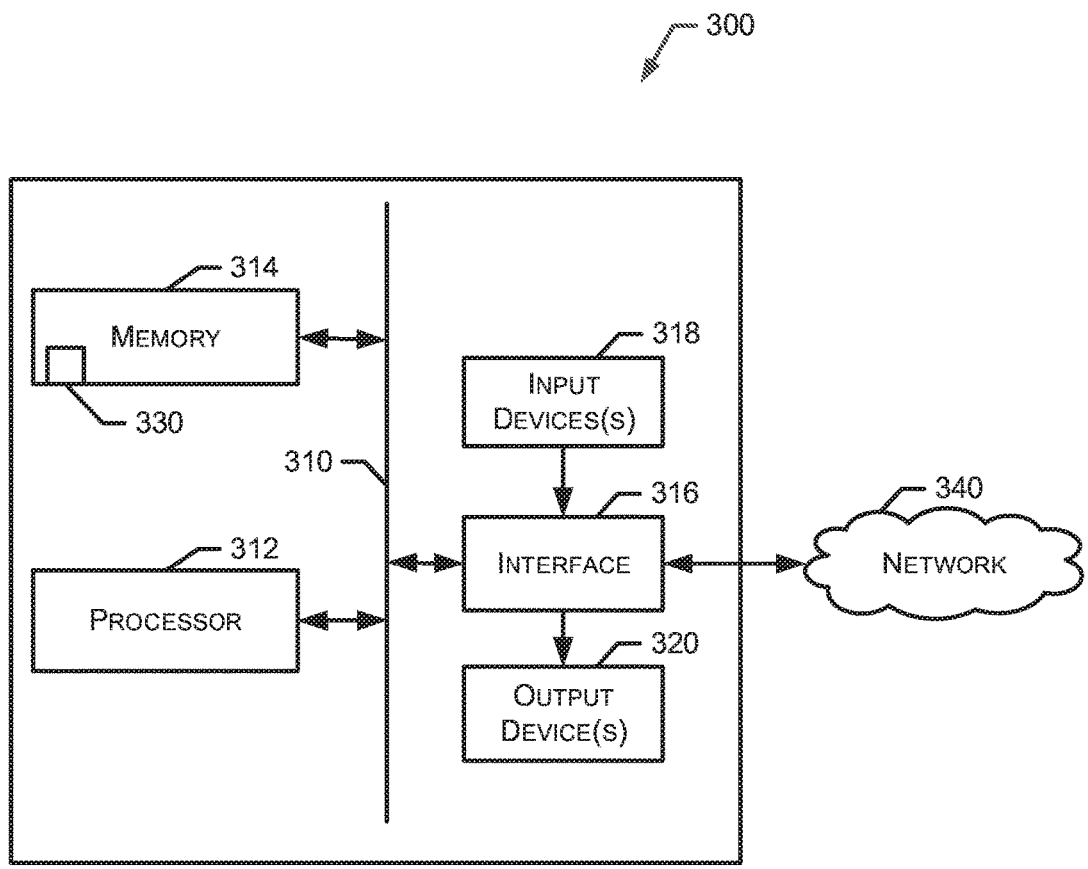
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Strategy Trading

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may include AUTOSPREADER®, provided by Trading Technologies.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
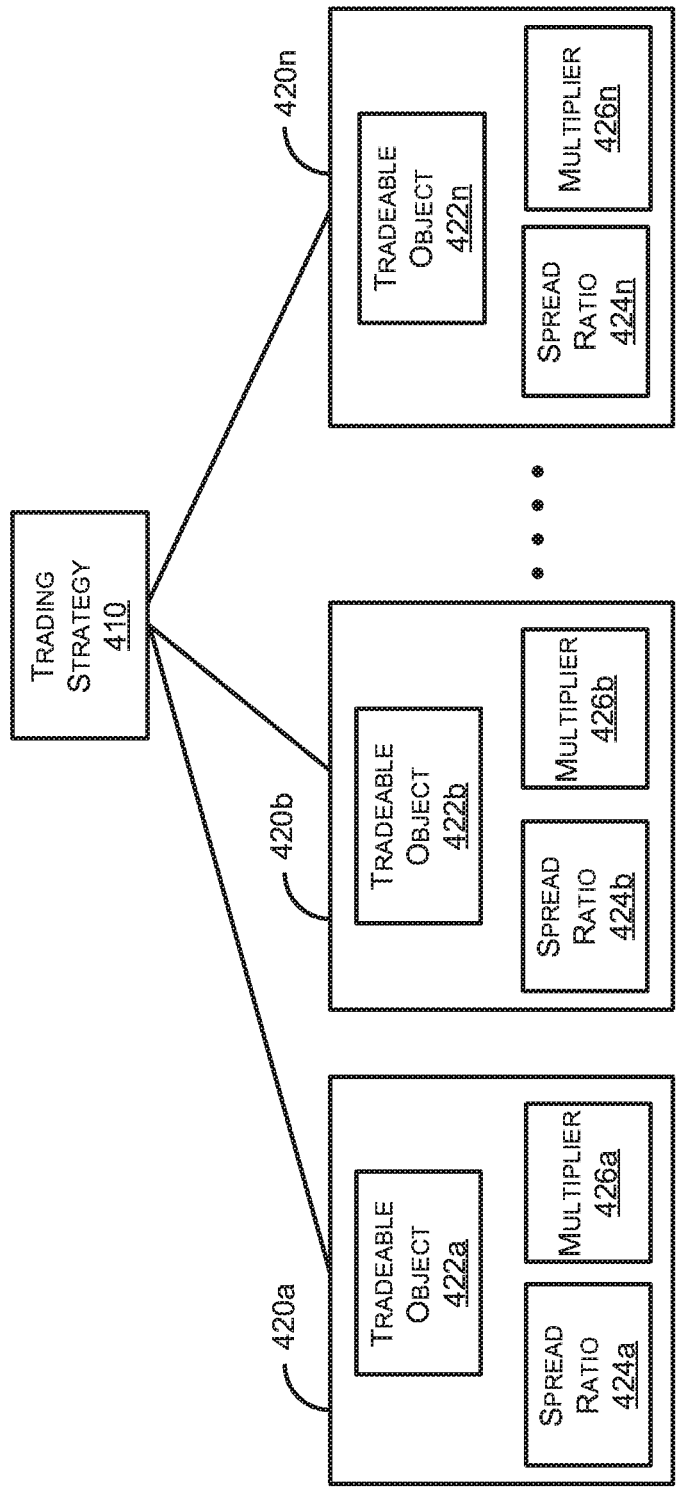
FIG. 4 illustrates a block diagram of a trading strategy, which may be employed with certain disclosed embodiments.

FIG. 4 illustrates a block diagram of a trading strategy 410 which may be employed with certain disclosed embodiments. The trading strategy 410 includes "n" legs 420 (individually identified as leg 420a to leg 420n). The trading strategy 410 defines the relationship between tradeable objects 422 (individually identified as tradeable object 422a to tradeable object 422n) of each of the legs 420a to 420n using the corresponding spread ratios 424a to 424n and multipliers 426a to 426n.

Once defined, the tradeable objects 422 in the trading strategy 410 may then be traded together according to the defined relationship. For example, assume that the trading strategy 410 is a spread with two legs, leg 420a and leg 420b. Leg 420a is for tradeable object 422a and leg 420b is for tradeable object 422b. In addition, assume that the spread ratio 424a and multiplier 426a associated with leg 420a are "1" and that the spread ratio 424b and multiplier 426b associated with leg 420b are "−1". That is, the spread is defined such that when the spread is bought, 1 unit of tradeable object 422a is bought (positive spread ratio, same direction as the spread) and 1 unit of tradeable object 422b is sold (negative spread ratio, opposite direction of the spread). As mentioned above, typically in spread trading the opposite of the definition applies. That is, when the definition for the spread is such that when the spread is sold, 1 unit of tradeable object 422a is sold (positive spread ratio, same direction as the spread) and 1 unit of tradeable object 422b is bought (negative spread ratio, opposite direction of the spread).

The price for the trading strategy 410 is determined based on the definition. In particular, the price for the trading strategy 410 is typically the sum of price the legs 420a-420n comprising the tradeable objects 422a-422n multiplied by corresponding multipliers 426a-426n. The price for a trading strategy may be affected by price tick rounding and/or pay-up ticks. However, both of these implementation details are beyond the scope of this discussion and are well-known in the art.

Recall that, as discussed above, a real spread may be listed at an exchange, such as exchange 130 and/or 230, as a tradeable product. In contrast, a synthetic spread may not be listed as a product at an exchange, but rather the various legs of the spread are tradeable at one or more exchanges. For the purposes of the following example, the trading strategy 410 described is a synthetic trading strategy. However, similar techniques to those described below may also be applied by an exchange when a real trading strategy is traded.

Continuing the example from above, if it is expected or believed that tradeable object 422a typically has a price 10 greater than tradeable object 422b, then it may be advantageous to buy the spread whenever the difference in price between tradeable objects 422a and 422b is less than 10 and sell the spread whenever the difference is greater than 10. As an example, assume that tradeable object 422a is at a price of 45 and tradeable object 422b is at a price of 40. The current spread price may then be determined to be (1)(45)+(−1)(40)=5, which is less than the typical spread of 10. Thus, a user may buy 1 unit of the spread, which results in buying 1 unit of tradeable object 422a at a price of 45 and selling 1 unit of tradeable object 422b at 40. At some later time, the typical price difference may be restored and the price of tradeable object 422a is 42 and the price of tradeable object 422b is 32. At this point, the price of the spread is now 10. If the user sells 1 unit of the spread to close out the user's position (that is, sells 1 unit of tradeable object 422a and buys 1 unit of tradeable object 422b), the user has made a profit on the total transaction. In particular, while the user bought tradeable object 422a at a price of 45 and sold at 42, losing 3, the user sold tradeable object 422b at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradeable objects 422 of the trading strategy 410 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, and/or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

VI. Example Methods to Employ Aggregated Order Quantity Modification Strategies

Figure 5:
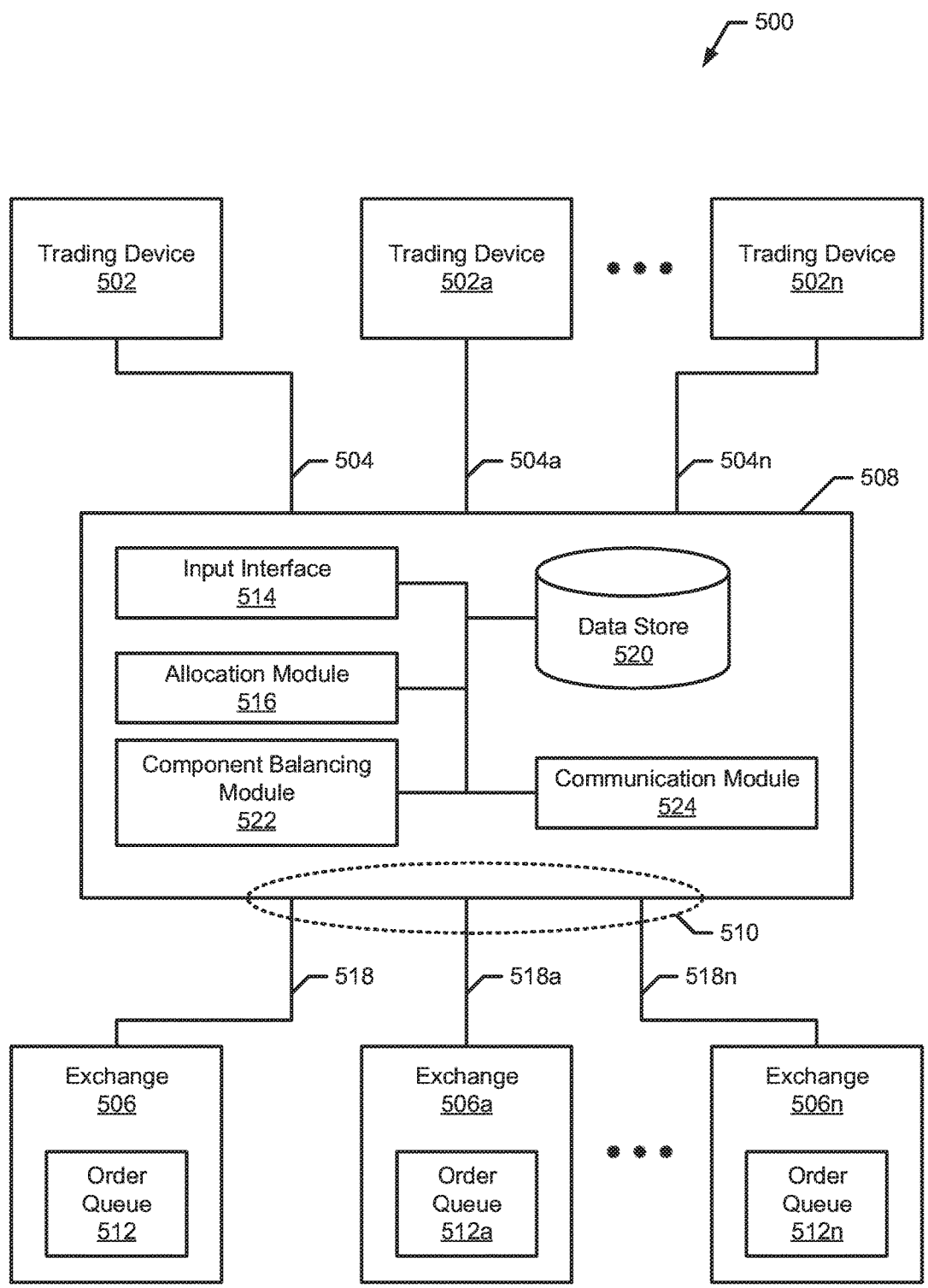
FIG. 5 illustrates a block diagram representative of an example trading system in which one or more trading device(s) can place trade order(s) with one or more exchanges via an example aggregator.

FIG. 5 illustrates an example trading system 500 in which one or more trading device(s) 502 can place trade order(s) 504 with one or more exchanges 506 via an example aggregator 508. The aggregator 508 collects the trade order(s) 504 and determines an aggregated order 510 based on the trade order(s) 504. For example, the aggregator 508 may determine a first aggregated order 510 based on one or more trade order(s) 504 related to a first tradeable object at a first price and determine a second aggregated order 510 based on the one or more trade order(s) related to the first tradeable object at a second price. In some examples, the aggregated order 510 may represent the collection of one or more new (e.g., initial) trade order(s) 504 related to the same tradeable object (e.g., an "initial" aggregated order). In some examples, the aggregated order 510 may represent a modification to a previously placed trade order and/or a modification to an initial aggregated order. Additionally or alternatively, the aggregator 508 may determine an aggregated order based on the rules and/or constraints defined as part of one or more different trading strategies. For example, in accordance with a spread ratio, the aggregator 508 may calculate a first quantity for a first tradeable object in response to market data related to a second tradeable object, and then add the first quantity for the first tradeable object with one or more trade order(s) 504 for the first tradeable object. For clarity, the following discussion will only refer to trade orders 504 for the same tradeable object at the same price.

As described above in connection with FIG. 2, when an exchange 506 receives a trade order 504, the exchange 506 tries to match the trade with one or more contra-side trade orders. For example, the exchange 506 tries to match a buy order of 100 contracts at $80 with a sell order of 100 contracts at $80. When the example exchange 506 is unable to fill an order, or a portion of the trade order, the working order (e.g., the unfilled order quantity) is placed in an order queue 512. The order queue 512 is typically implemented using a first-in, first-out (FIFO) strategy. For example, if an exchange receives a first trade order to buy 5 contracts followed by a second trade order to buy 10 contracts, the exchange fills the first trade order buy request for 5 contracts before attempting to fill the second trade order request for 10 contracts. For example, if the exchange 506 has 2 contracts available to sell, the order queue 512 includes an updated first trade order to buy 3 contracts and the second trade order to buy 10 contracts.

The example trading device 502 of FIG. 5 may be an implementation of, for example, the trading device 110 of FIG. 1. The example exchanges 506 of FIG. 5 may be implementations of, for example, the exchange 130 of FIG. 1.

In the illustrated example of FIG. 5, the example aggregator 508 includes an example input interface 514, an example allocation module 516, an example data store 520, an example component balancing module 522 and an example communication module 524. Although the example aggregator 508 of FIG. 5 is illustrated as a separate component of the trading system 500, the aggregator 508 may be implemented by the trading devices 502 and/or, for example, the gateway 120 of FIG. 1.

The example aggregator 508 of FIG. 5 includes the example input interface 514 associated with allocation and re-balancing of order quantities. The example input interface 514 FIG. 5 facilitates receiving information from the trading devices 502. For example, the input interface 514 may be accessed by a trader to specify an allocation rule and/or a re-balancing strategy. To receive information, the example input interface 514 implements one or more selection, configuration, and/or input screens. For example, the input interface 514 facilitates a rule selection screen that enables a trader to define one or more allocation rules and/or re-balancing rules. As another example, the input interface 514 facilitates a settings screen that includes one or more selectable options for consideration of position-in-queue of the component at the exchange when redistributing component quantities 512.

The example input interface 514 of FIG. 5 further facilitates receiving the trade orders 504 (and/or the modified trade orders 504) from the trading device 502. The example input interface 514 determines whether the trade order 504 represents an initial trade order or a modified trade order (e.g., a request to change a quantity of an initial trade order).

To place the aggregated order 510 with more than one of the exchanges 506, the example aggregator 508 of FIG. 5 utilizes an allocation module 516. The example allocation module 516 enables the aggregator 508 to request distribution of an aggregated order 510 among the exchanges 506 according to one or more allocation rules (e.g., fixed percentage, position-in-queue, rank, etc.). The example allocation module 516 receives the initial trade orders 504 from the input interface 514 and determines an aggregated order 510. For example, the allocation module 516 may combine the different trade orders 504 related to the same tradeable object at the same price.

The example allocation module 516 then allocates components 518 of the aggregated order 510 to one or more exchange(s) 506. For example, the allocation module 516 may allocate a first component 518 to a first exchange 506, a second component 518 to a second exchange 506, and an nth component 518 to an nth exchange 506. In the illustrated example, the sum of the components 518 equals the quantity of the aggregated order 510. The sum of the components 518 also equals the sum of the trade orders 504. The example exchanges 506 attempt to fill a quantity of the component assigned to them (e.g., child working order quantities). The example allocation module 516 also stores the quantity of the initial components that were allocated to the respective exchanges 506 in the example data store 520.

In the illustrated example of FIG. 5, in response to determining that the trade order 504 is a modified trade order, the example input interface 514 provides the modified trade order 504 to the example component balancing module 522. The example component balancing module 522 of FIG. 5 may employ different techniques for re-balancing the component quantities 518 between the exchanges 506. In some examples, the component balancing module 522 re-balances the component quantities 518 based on a default strategy. The default strategy may specify an allocation strategy or rule (e.g., an allocation rule may specify components are to be allocated equally and/or according to predefined percentages) to be applied to the component quantities 518. For example, the default strategy may attempt to rebalance component to minimize the position-in-queue. Additionally or alternatively, the example component balancing module 522 may re-balance the component quantities 518 based on a selected strategy. For example, the component balancing module 522 may receive a preferred strategy from, for example, a trader. In some examples, the component balancing module 522 may employ multiple strategies based on, for example, the modification quantity (sometimes referred to herein as a "change in quantity" or a "delta quantity"). For example, the component balancing module 522 may utilize a first re-balancing strategy when the modification quantity is less than a first threshold and the component balancing module 522 may utilize a second re-balancing strategy when the modification quantity is greater than or equal to a second threshold. In some examples, the component balancing module 522 applies a re-balancing strategy based on a type of the trade order. For example, by selecting a first re-balancing strategy for all buy orders and a second re-balancing strategy for all sell orders.

When the example allocation module 516 has determined the components 518 of the aggregated order 510 to be allocated to each of the exchanges 506 and/or the example component balancing module 522 has determined updated components 518 of the modified aggregated order 510 to be allocated to each of the exchanges 506, the allocation module 516 and/or the component balancing module 522 provides the determinations to a communication module 524. The example communication module 524 routes the respective components to the corresponding exchanges 506. Routing a component to one of the exchanges 506 may involve, for example, sending a message to the exchange including a price, a tradeable object identifier, a quantity to be bought or sold, an account identifier, etc.

Additionally, the communication module 524 may request confirmation of the distribution of the components to the respective exchanges 506 by a trader. If the trader approves of the distribution of the components, the components are then routed to the exchanges 506.

Figure 6:
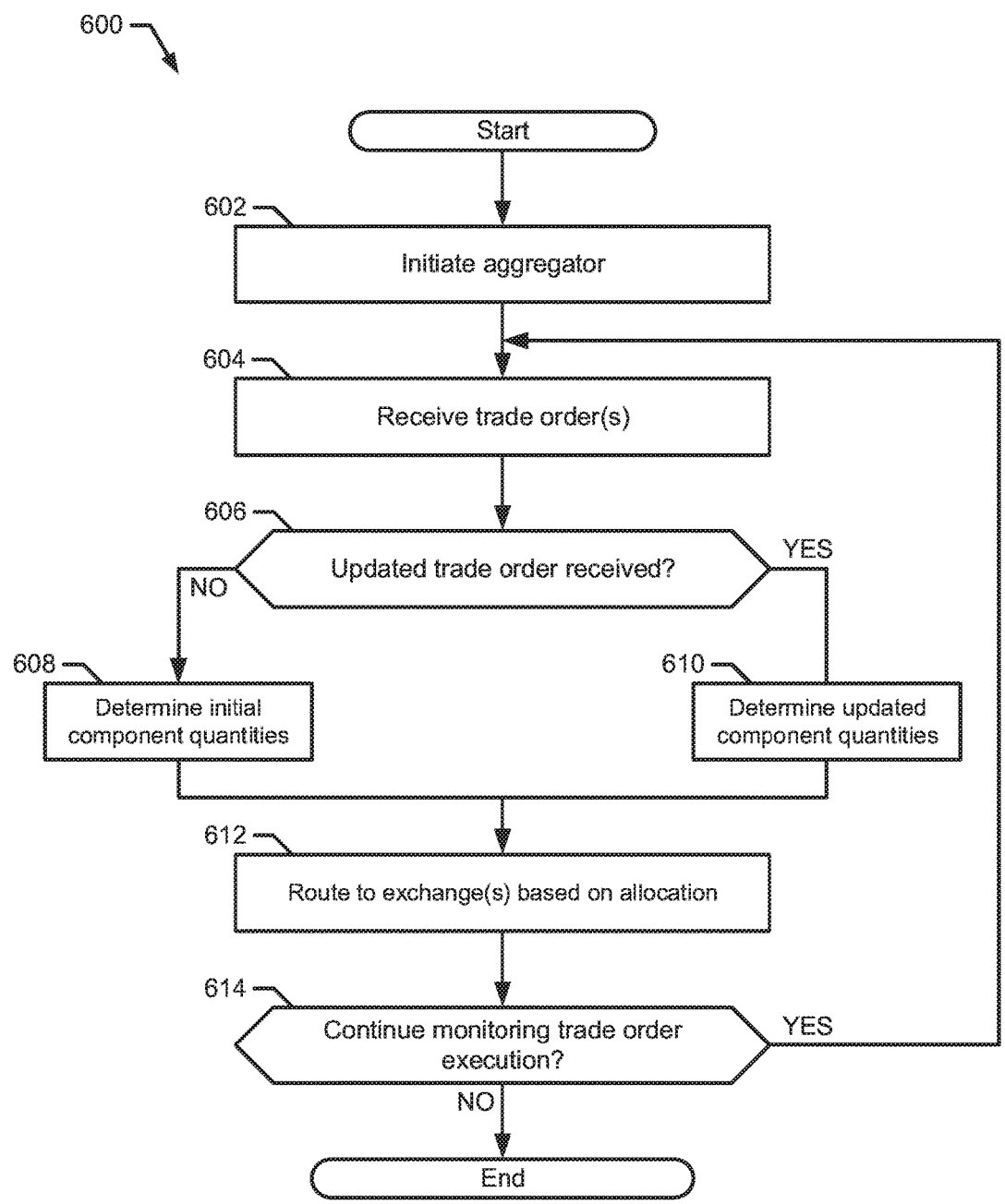
FIG. 6 is a flow diagram illustrative of machine readable instructions that may be executed to implement the example aggregator of FIG. 5.

FIG. 6 is a flowchart representative of machine readable instructions capable of implementing functionality associated with the example aggregator 508 of FIG. 5. The example machine readable instructions collectively define a program 600 shown in FIG. 6. The program 600 begins at block 602 when the example aggregator 508 is initiated. Such an initiation may correspond to execution of the aggregator 508 on the trading device 502 of FIG. 5 via the input interface 514. At block 604, the example input interface 514 receives a trade order 504 from the trading devices 502. At block 606, the example input interface 514 determines whether the trade order 504 is a request to place an initial order or a request to modify a trade. For example, the input interface 514 may receive an updated trade order quantity and/or a change in quantity. If, at block 606, the example input interface 514 determined that the trade order was a request to place an initial order, then, at block 608, the example allocation module 516 determines the initial component quantities 518 to allocate to the one or more exchange(s) 506. For example, the allocation module 516 may aggregate the trade orders 504 corresponding to the same tradeable object and the same price to determine the aggregated order 510 and allocate the components 518 of the aggregated order 510 based on, for example, an allocation rule retrieved from the data store 520. Control then proceeds to 612 to route the initial component quantities 518 to the respective exchanges 506.

If, at block 606, the example input interface 514 determined that the trade order 504 was a request to modify a trade order, then, at block 610, the example component balancing module 522 determines updated component quantities 518 to allocate to the one or more exchange(s) 506. For example, the component balancing module 522 may distribute updated components 518 to the exchange(s) 506 based on a change in quantity, the type of trade order (e.g., a buy order or a sell order), a preferred re-balancing strategy (e.g., a user-selected strategy), a default strategy, etc.

After the allocation module 516 allocates the component quantities of the aggregated order 510 at block 608, or, after the component balancing module 522 allocates the updated component quantities of the updated aggregated order 510 at block 610, then, at block 512, the example communication module 524 routes the allocated components to the appropriate exchanges. At block 614, the example aggregator 508 determines whether to continue monitoring trade order execution. For example, the aggregator 508 may determine that the trade aggregated order 510 has been executed (e.g., the working orders have been filled and/or the working orders have been cancelled). If, at block 614, the example aggregator 508 determined to continue monitoring trade order execution, control returns to block 604 to receive a trade order 504.

If, at block 614, the example aggregator 508 determined to not continue monitoring trade order execution, the example program 600 of FIG. 6 ends.

A. An Example Re-Balancing Strategy Based on a Fixed Percentage Allocation

As described above, the example component balancing module 522 may update component quantities 518 allocated to exchanges 506 in response to a modified aggregated order 510. An example re-balancing strategy disclosed herein employs fixed percentage allocation to the working orders at the exchanges 506. For example, consider an illustrative example in which the allocation module 516 determined an initial aggregated order 510 related to 200 shares of a company. In the illustrated example, the initial aggregated order quantity (200) is allocated between two exchanges at a 60/40 ratio (e.g., Exchange 1 (E1) is allocated 60% of the 200 shares (e.g., 120 shares) and Exchange 2 (E2) is allocated 40% of the 200 shares (e.g., 80 shares)). Assume, after a partial fill of the initial aggregated order quantity, the component balancing module 522 determined an updated aggregated order 510 based on, for example, a change in quantity of 20 shares (e.g., an increase in total shares to 220 shares). An example Table 1 illustrates a snapshot of the aggregated order execution at the time the updated aggregated order quantity (220 shares) is determined.

TABLE 1

| Action | Total Quantity | Change in Quantity | E1% | E2% | E1 Filled | E2 Filled | E1 Working | E2 Working |
|---|---|---|---|---|---|---|---|---|
| Placement | 200 | — | 60 | 40 | 0 | 0 | 120 | 80 |
| Partial Fill | 200 | — | 60 | 40 | 40 | 70 | 80 | 10 |

As shown in the example Table 1, at the time the updated aggregated order quantity was determined, Exchange 1 had filled 40 of the 120 shares it was allocated and Exchange 2 had filled 70 of the 80 shares it was allocated. The example component balancing module 522 of FIG. 5 may adjust the component quantities 518 allocated to the two exchanges based on a fixed percentage allocation.

Example approaches of applying a fixed percentage allocation to component quantities in response to an updated aggregated order include applying the fixed percentage allocation to an aggregated working quantity or applying the fixed percentage allocation to the updated aggregated order quantity.

Figure 7:
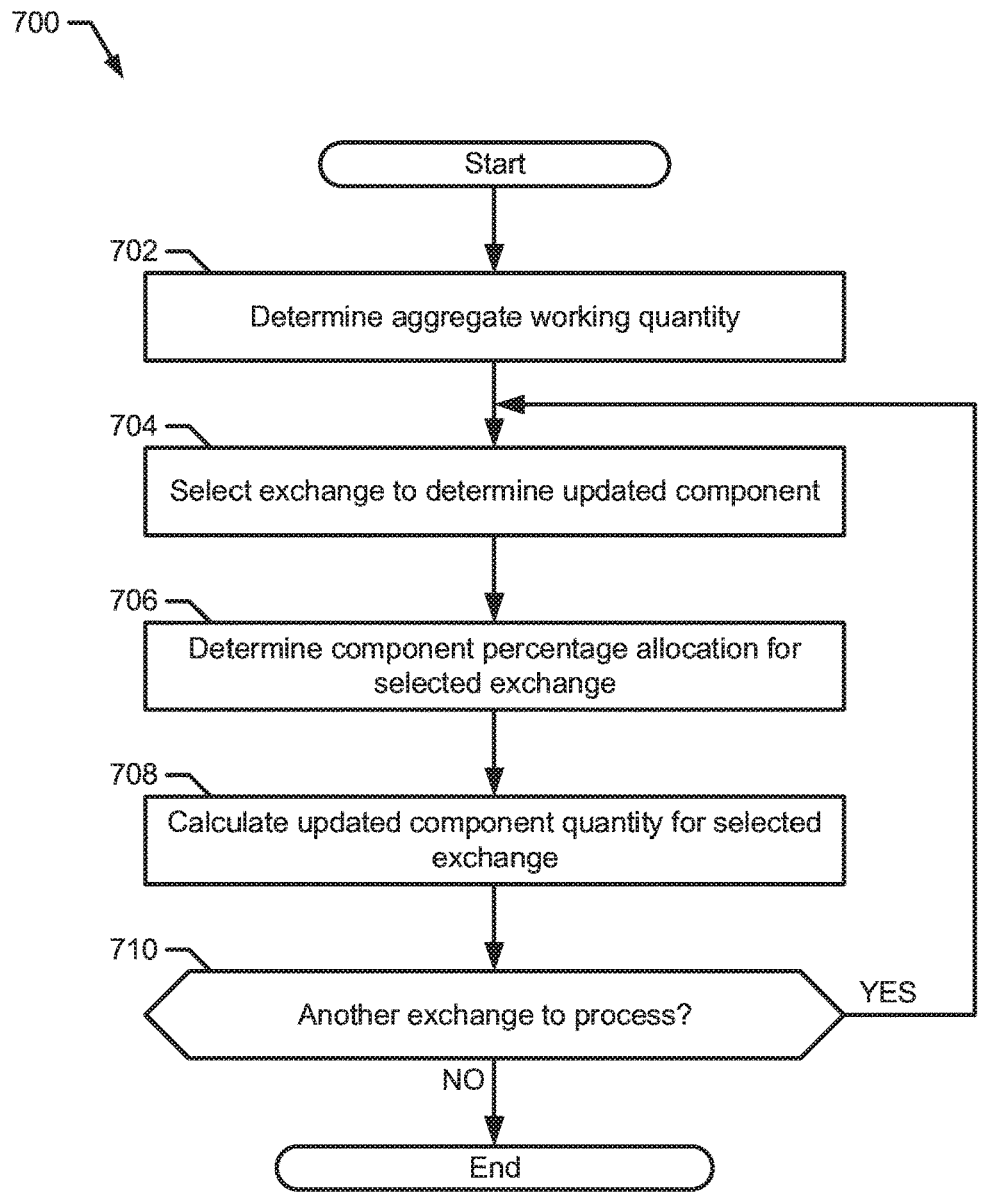
FIGS. 7, 8, and 9 are flow diagrams illustrative of machine readable instructions that may be executed to implement the example component balancing module of FIG. 5 to employ an aggregated order quantity modification strategy based on a fixed percentage allocation.

FIG. 7 illustrates an example first approach of employing a fixed percentage allocation to a modified aggregated order by applying the fixed percentage allocation to the aggregated working quantity. In some such examples, the component balancing module 522 determines an aggregate working quantity based on working order quantities at the exchanges 506 and the change in quantity of the aggregated order (e.g., the difference between the updated aggregated order quantity and the initial aggregated order quantity) and applies the fixed percentage allocations for the aggregated order quantity to the aggregate working quantity.

FIG. 7 is a flowchart representative of machine readable instructions that may be executed to implement the example component balancing module 522 of FIG. 5. In the illustrated example, the program 700 may be used to implement block 610 of FIG. 6.

The example program 700 of FIG. 7 begins at block 702 when the example component balancing module 522 determines a current aggregate working quantity of the aggregated order. For example, the component balancing module 522 may retrieve trade order information (e.g., a filled quantity and/or a working quantity) from each of the exchanges 506 allocated to perform the initial aggregated order 510, and sum the respective working quantities and a change in quantity to determine the aggregate working quantity. In some examples, the component balancing module 522 may retrieve the trade order information from the example communication module 524 of FIG. 5.

In the illustrated example, the component balancing module 522 utilizes Equation 1 to calculate the current aggregate working quantity.

$$\text{AggWorking} = \text{oldAggWorking} + \text{ChangeQty} \quad \text{Equation 1:}$$

In the example Equation 1, the "oldAggWorking" variable represents the sum of the working order quantities at the respective exchanges 506 at the time the updated aggregated order 510 is determined. For example, in the above example, the "oldAggWorking" variable is the sum of the working order quantities at the first exchange (e.g., 80 shares) and the second exchange (e.g., 10 shares). The example "ChangeQty" variable represents the change in quantity between the initial aggregated order quantity and the updated aggregated order quantity. In some examples, a user may provide the change in quantity. In other examples, the component balancing module 522 may determine the change in quantity based on the difference between the initial aggregated order quantity (e.g., 200 shares) and the updated aggregated order quantity (e.g., 220 shares). In the illustrated example, the current aggregate working quantity "AggWorking" is 110 shares (e.g., 90 shares+20 shares).

At block 704, the example component balancing module 522 selects an exchange 506 for which to calculate an updated component quantity. For example, the component balancing module 522 may select the first exchange 506 that is allocated 60% of the initial aggregated order (e.g., 120 shares) and has a working order quantity of 80 shares. In some examples, the component balancing module 522 randomly selects the exchange to process. Additionally or alternatively, the example component balancing module 522 may select an exchange based on an order (e.g., the exchange having the largest working order, the exchange having the smallest working order, the exchange having filled the highest percent of their initial working order quantities, the exchange having filled the lowest percent of their initial working order quantities, etc.).

At block 706, the example component balancing module 522 determines a fixed percentage allocated to the selected exchange. For example, the component balancing module 522 may retrieve fixed percentage information from the example data store 520. In the illustrated example, the first exchange is allocated 60% of the aggregated order quantity.

At block 708, the example component balancing module 522 calculates an updated component quantity for the selected exchange. For example, the component balancing module 522 may utilize Equation 2 to calculate the updated component quantity for the selected exchange based on an aggregate working quantity.

$$\text{ComponentQuantity}_i = \text{ComponentPercent}_i * \text{AggWorking} \quad \text{Equation 2:}$$

In the example Equation 2, the "ComponentQuantity$_i$" represents the updated component quantity for the i-th component (e.g., the updated quantity of shares allocated to the first exchange). The example "ComponentPercent$_i$" variable represents the fixed percentage allocated to the respective exchange (e.g., 60%). The example "AggWorking" variable represents the aggregate working quantity (110 shares). By applying the variables to the example Equation 2, the updated component quantity for the first exchange is 66 shares (e.g., 60%×110 shares=66 shares).

At block 710, the example component balancing module 522 determines whether there is another exchange 506 for which to calculate an updated component quantity. If, at block 710, the example component balancing module 522 determined that there is another exchange for which to calculate an updated component quantity, then control returns to block 704 to select an unprocessed exchange (e.g., the example second exchange).

An example Table 2 illustrates a snapshot of the aggregated order execution at the time when the updated component quantities are determined and when the updated aggregated order is completed. For example, the Table 2 illustrates the updated working order quantities allocated to the exchanges E1 and E2 and the final allocation of the shares when the updated aggregated order is filled. For example, the first row of the Table 2 illustrates that a change in quantity of 20 shares was determined and that the updated component quantities allocated to the exchanges E1, E2 is 66 shares and 44 shares, respectively. Furthermore, the example second row of the Table 2 illustrates when all 220 shares of the updated aggregated order are purchased by the exchanges E1, E2, the first exchange E1 purchased a total of 106 shares (e.g., 40 shares filled at the partial fill point plus 66 shares when the E1 working quantity was adjusted) and the second exchange E2 purchased a total of 114 shares (e.g., 70 shares filled at the partial fill point plus 44 shares when the E2 working quantity was adjusted).

TABLE 2

| Action | Total Quantity | Change in Quantity | E1% | E2% | E1 Filled | E2 Filled | E1 Working | E2 Working |
|---|---|---|---|---|---|---|---|---|
| Qty Adjusted | 220 | +20 | 60 | 40 | 40 | 70 | 66 | 44 |
| Order Filled | 220 | — | 48 | 52 | 106 | 114 | 0 | 0 |

If, at block 710, the example component balancing module 522 determined there was not another exchange to process (e.g., after both example exchanges E1, E2 have been processed in the above example), the example program 700 of FIG. 7 ends. For example, control may return to block 612 of FIG. 6 to route the updated component quantities to the respective exchanges.

Figure 8:
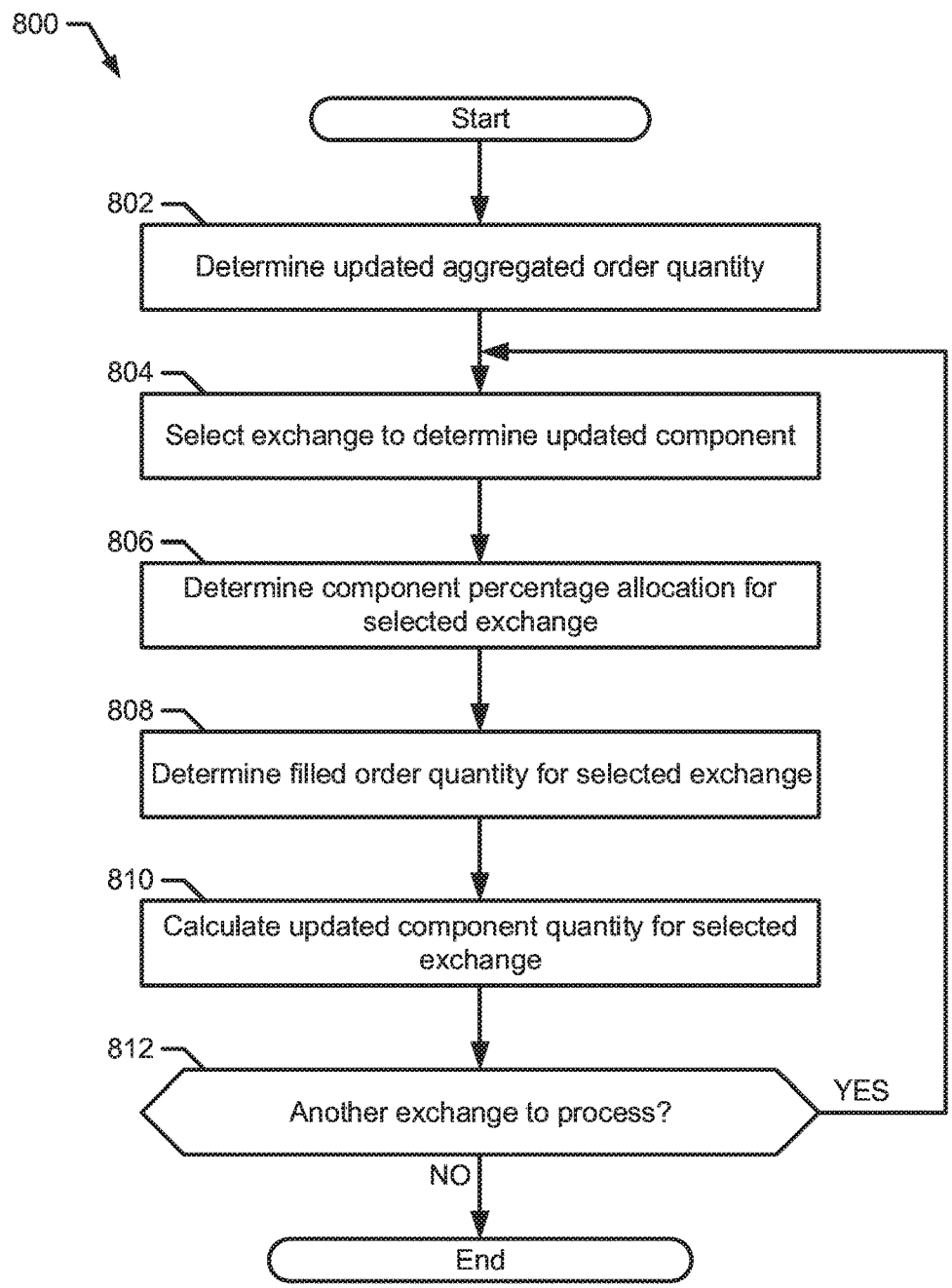

FIG. 8 illustrates an example second approach of employing a fixed percentage allocation to a modified aggregated order by applying the fixed percentage allocation to the updated aggregated order quantity. In some such examples, the component balancing module 522 determines an updated aggregated order quantity based on the initial aggregated order quantity 510 and the change in quantity of the aggregated order (e.g., the difference between the updated aggregated order quantity and the initial aggregated order quantity) and applies the fixed percentage allocations for the aggregated order quantity to the updated aggregated order quantity.

FIG. 8 is a flowchart representative of machine readable instructions that may be executed to implement the example component balancing module 522 of FIG. 5. In the illustrated example, the program 800 may be used to implement block 610 of FIG. 6. The example program 800 of FIG. 8 begins at block 802 when the example component balancing module 522 determines the updated aggregated order quantity. For example, the component balancing module 522 may retrieve an updated trade order quantity and/or a change in quantity from the example input interface 514 (FIG. 5). Referring to the above example, the updated aggregated order quantity is 220 shares (e.g., the initial aggregated order quantity of 200 shares plus the change in quantity of 20 new shares).

At block 804, the example component balancing module 522 selects an exchange 506 for which to calculate an updated component quantity. For example, the component balancing module 522 may select the first exchange 506 that is allocated 60% of the initial aggregated order and has a working order quantity of 80 shares. In some examples, the component balancing module 522 randomly selects the exchange to process. Additionally or alternatively, the example component balancing module 522 may select an exchange based on an order (e.g., the exchange having the largest working order, the exchange having the smallest working order, the exchange having filled the highest percent of their initial working order quantities, the exchange having filled the lowest percent of their initial working order quantities, etc.).

At block 806, the example component balancing module 522 determines a fixed percentage allocated to the selected exchange. For example, the component balancing module 522 may retrieve fixed percentage information from the example data store 520. In the illustrated example, the first exchange is allocated 60% of the aggregated order quantity.

At block 808, the example component balancing module 522 determines a filled order quantity for the selected exchange. For example, the component balancing module 522 may retrieve trade order information (e.g., a filled quantity and/or a working quantity) from the respective exchange (for example, via the communication module 524). In the illustrated example, at the time when the component balancing module 522 determines the updated aggregated order, the first exchange E1 has filled 40 shares.

At block 810, the example component balancing module 522 calculates an updated component quantity for the selected exchange. For example, the component balancing module 522 may utilize Equation 3 to calculate the updated component quantity for the selected exchange (e.g., the first exchange E1) based on the updated aggregated order quantity $$ComponentQuantity_i = (ComponentPercent_i * UpdatedTotal) - ComponentFilled_i \qquad \text{Equation 3:}$$

In the example Equation 3, the "ComponentQuantity" represents the updated component order quantity being calculated. The example "ComponentPercent" variable represents the fixed percentage allocated to the respective exchange (e.g., 60%). The example "UpdatedTotal" variable represents the updated aggregated order quantity (e.g., 220 shares). The example "ComponentFilled" variable represents the filled quantity of the initial component quantity for the respective exchange. By applying the variables to the example Equation 3, the updated component quantity for the first exchange is 92 shares (e.g., (60%–220 shares)–40 filled shares=92 working order quantity).

At block 812, the example component balancing module 522 determines whether there is another exchange 506 for which to calculate an updated component quantity. If, at block 812, the example component balancing module 522 determined that there is another exchange for which to calculate an updated component quantity, then control returns to block 804 to select an unprocessed exchange (e.g., the example second exchange E2).

An example Table 3 illustrates a snapshot of the aggregated order execution at the time when the updated component quantities are determined based on the updated aggregated order quantity and when the updated aggregated order is completed. For example, the Table 3 illustrates the updated working order quantities allocated to the exchanges E1 and E2 and the final allocation of the shares when the updated aggregated order is filled. For example, the first row of the Table 3 illustrates that a change in quantity of 20 shares was determined and that the updated component quantities allocated to the exchanges E1, E2 are 92 shares and 18 shares, respectively. Furthermore, the example second row of the Table 3 illustrates when all 220 shares of the updated aggregated order are purchased by the exchanges E1, E2, the first exchange E1 purchased a total of 132 shares (e.g., 40 shares filled at the partial fill point plus 92 shares when the E1 working quantity was adjusted) and the second exchange E2 purchased a total of 88 shares (e.g., 70 shares filled at the partial fill point plus 18 shares when the E2 working quantity was adjusted).

TABLE 3

| Action | Total Quantity | Change in Quantity | E1% | E2% | E1 Filled | E2 Filled | E1 Working | E2 Working |
|---|---|---|---|---|---|---|---|---|
| Qty Adjusted | 220 | +20 | 60 | 40 | 40 | 70 | 92 | 18 |
| Order Filled | 220 | — | 60 | 40 | 132 | 88 | 0 | 0 |

If, at block 812, the example component balancing module 522 determined there was not another exchange to process (e.g., after both example exchanges E1, E2 have been processed in the above example), the example program 800 of FIG. 8 ends. For example, control may return to block 612 of FIG. 6 to route the updated component quantities to the respective exchanges.

In some instances, applying the second approach may result in one or more negative numbers that indicates an overfill with respect to the current allocation strategy. For example, consider an illustrative example in which the allocation module 516 determined an initial aggregated order 510 related to 200 shares of a company. In the illustrated example, the initial aggregated order quantity (200) is allocated between three exchanges at a 50/30/20 ratio (e.g., a first exchange E1 is allocated 50% of the 200 shares (e.g., 100 shares), a second exchange E2 is allocated 30% of the 200 shares (e.g., 60 shares) and an example exchange (E3) is allocated 20% of the 200 shares (e.g., 40 shares)). Assume, after a partial fill of the initial aggregated order quantity, the component balancing module 522 determined an updated aggregated order 510 based on, for example, a change in quantity of negative 100 shares (e.g., a decrease in total shares to 100 shares). An example Table 4 illustrates a snapshot of the aggregated order execution at the time the updated aggregated order quantity (100 shares) is determined.

TABLE 4

| Action | Total Quantity | Change in Quantity | E1% | E2% | E3% | E1 Filled | E2 Filled | E3 Filled | E1 Working | E2 Working | E3 Working |
|---|---|---|---|---|---|---|---|---|---|---|---|
| Placement | 200 | — | 50 | 30 | 20 | 0 | 0 | 0 | 100 | 60 | 40 |
| Partial Fill | 200 | — | 50 | 30 | 20 | 9 | 35 | 6 | 91 | 25 | 34 |
| Preliminary Qty | 100 | −100 | 50 | 30 | 20 | 9 | 35 | 6 | 41 | −5 | 14 |
| Qty Adjusted | 100 | −100 | 65 | 0 | 35 | 9 | 35 | 6 | 33 | 0 | 17 |
| Order Filled | 100 | — | 42 | 35 | 23 | 42 | 35 | 23 | — | — | — |

As shown in the example Table 4, at the time the updated aggregated order quantity was determined, the first exchange E1 had filled 9 of the 100 shares it was allocated, the second exchange E2 had filled 35 of the 60 shares it was allocated and the third exchange E3 had filled 6 of the 40 shares it was allocated. The example component balancing module 522 of FIG. 5 may adjust the component quantities 518 allocated to the three exchanges based on a fixed percentage allocation applied to the updated aggregated total quantity (e.g., 100 shares).

In the illustrated example, by applying the negative change in quantity (e.g., a decrease of 100 shares) to the example Equation 3 above for the first exchange E1, the calculated component quantity for the first exchange is:

$$ComponentQuantity_{E1} = (ComponentPercent_{E1} * \quad \text{Equation 3}$$
$$UpdatedTotal) -$$

-continued
$$ComponentFilled_{E1}$$
$$= (50\% * 100 \text{ updated}$$
$$\text{aggregated order shares}) -$$
$$(9 \text{ filled shares})$$
$$= 41 \text{ shares}$$

In the illustrated example, by applying the negative change in quantity (e.g., a decrease of 100 shares) to the example Equation 3 above for the second exchange E2, the calculated component quantity for the second exchange is:

$$ComponentQuantity_{E2} = ((ComponentPercent)_{E2} * \quad \text{Equation 3}$$
$$UpdatedTotal) -$$
$$ComponentFilled_{E2}$$
$$= (30\% * 100 \text{ updated}$$
$$\text{aggregated order shares}) -$$
$$(35 \text{ filled shares})$$
$$= -5 \text{ shares}$$

In the illustrated example, a negative component quantity represents an overfill in one or more of the components. For example, if the initial aggregated order is to buy 200 shares and the updated aggregated order is to buy 100 shares, a negative component quantity (e.g.,−5 shares) indicates that 5 more shares have been filled for that component than was specified by the current allocation. When an overfill occurs, the component balancing module 522 may not be able to achieve the desired and/or specified allocation of quantity.

Figure 9:
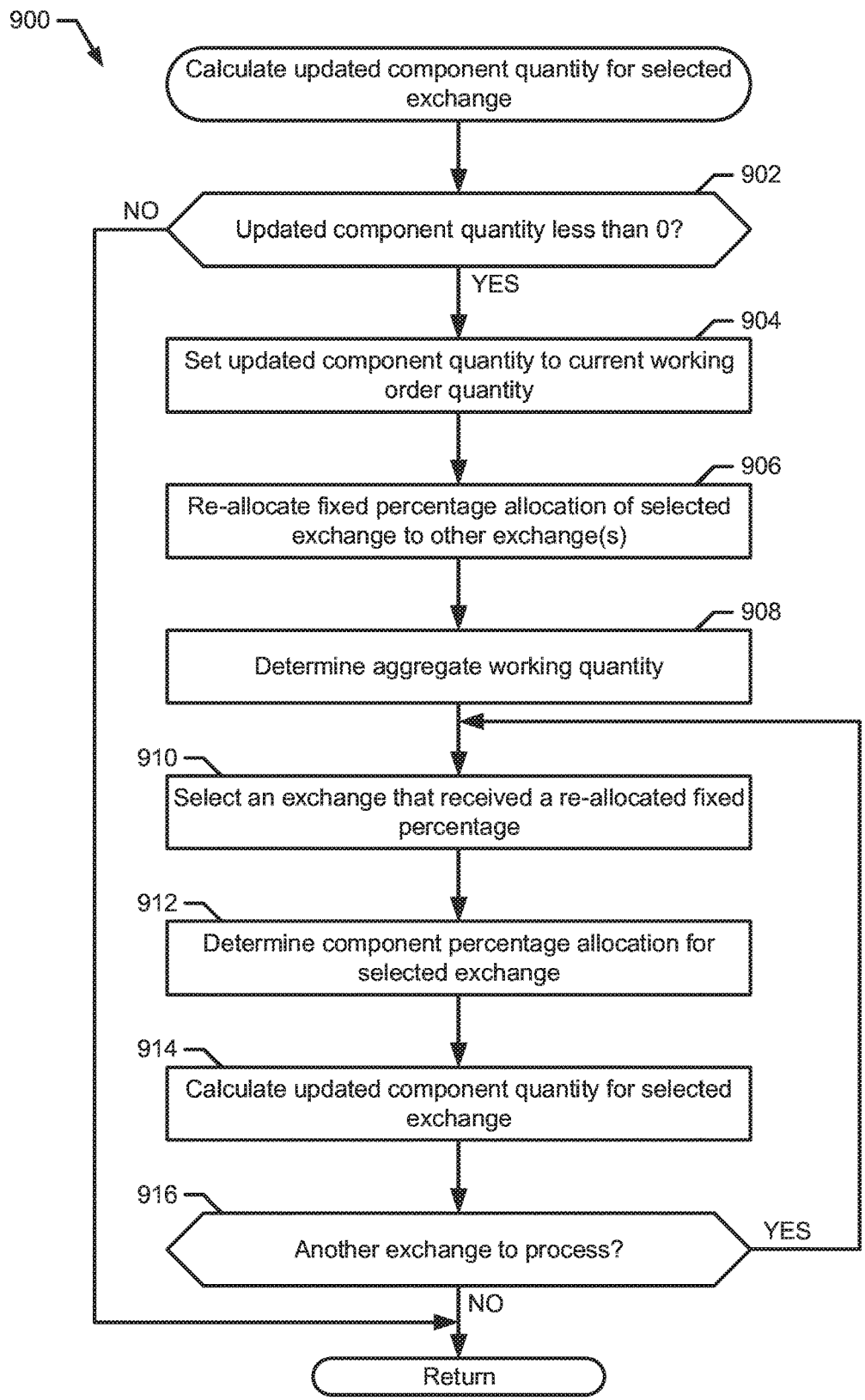

FIG. 9 is a flowchart representative of machine readable instructions that may be executed to implement the example component balancing module 522 of FIG. 5. In the illustrated example, the program 900 may be used to implement the functionality associated with block 810 of FIG. 8. For example, the component balancing module 522 may execute the program 900 of FIG. 9 when the change in quantity between the initial aggregated order and the updated aggregated order is negative. The example program 900 of FIG. 9 begins at block 902, when the example component balancing module 522 determines whether the updated component quantity is less than a threshold (e.g., zero). For example, with reference to the third row of the Table 4 (e.g., the "Preliminary Quantities" row), applying the Equation 3 to the first exchange E1 results in a positive value (e.g., 41 shares). If, at block 902, the example component balancing module 522 determined that the updated component quantity satisfied the threshold (e.g., was greater than or equal to zero), then the program 900 may return to block 812 of FIG. 8 to determine whether there is another exchange to process.

If, at block 902, the example component balancing module 522 determined that the updated component quantity failed to satisfy the threshold (e.g., was less than zero) (for example, with reference to the third row of the Table 4, applying the Equation 3 to the second exchange E2 results in a negative value (e.g.,–5 shares)), then, at block 904, the example component balancing module 522 sets the updated component quantity of the selected exchange to the current working order quantity of the selected exchange. In the illustrated example, the component balancing module 522 sets the updated component quantity of the second exchange E2 to zero indicating that no additional quantity is to be allocated to that exchange.

At block 906, the example component balancing module 522 re-allocates the fixed percentage allocated to the selected exchange to the one or more other exchanges. For example, in the illustrated example, the percentage of the initial aggregated order quantity that is allocated to the second exchange (e.g., 30%) is re-allocated to the first exchange E1 and the third exchange E3. By re-allocating the fixed percentage originally allocated to the second exchange, the component balancing module 522 prevents additional overfilling from occurring at the second exchange. For example, the component balancing module 522 may re-allocate the percentages evenly between the other exchanges (e.g., the first exchange and the third exchange). In some such examples, at block 906, the component balancing module 522 re-allocates 15% to the first exchange (e.g., the first exchange is allocated 65% of the updated aggregated order quantity) and re-allocates 15% to the third exchange (e.g., the third exchange is allocated 35% of the updated aggregated order quantity). In certain embodiments, the component balancing module 522 may re-allocate the percentages between the other exchanges in a proportional manner, according to a hierarchy (i.e., exchanges may be identified as preferential exchanges), based on the volume of trades at the exchanges, etc.

At block 908, the example component balancing module 522 determines an aggregate working quantity based on the working order quantities at the exchanges. For example, the component balancing module 522 may utilize example Equation 4 to determine the aggregate working quantity.

$$AggWorking = oldAggWorking + ChangeQty \quad \text{Equation 4:}$$

In the example Equation 4, the "oldAggWorking" variable represents the sum of the working order quantities at the respective exchanges 506 at the time the updated aggregated order 510 is determined. For example, in the above example, the "oldAggWorking" variable is the sum of the working order quantities at the first exchange (e.g., 91 shares), the second exchange (e.g., 25 shares) and the third exchange (e.g., 34 shares). The example "ChangeQty" variable represents the change in quantity between the initial aggregated order quantity and the updated aggregated order quantity (e.g., –100 shares). Based on the above example values, the current aggregate working quantity "AggWorking" is zero (0) shares (e.g., (91 shares+25 shares+34 shares)+(–100 shares)=50 shares). The new current aggregate working quantity is, in turn, allocated across the remaining exchanges (i.e., the first exchange and the third exchange) having non-negative working quantities. The second exchange has an updated component quantity of–5 indicating that an overfill has occurred and resulting in no additional allocation in response to the received change in quatity.

At block 910, the example component balancing module 522 selects an exchange that received re-allocated fixed percentage (e.g., the first exchange E1 or the third exchange E3). At block 912, the example component balancing module 522 determines a component percentage allocation for the selected exchange. For example, the component percentage allocation for the first exchange E1 is 65% of the current aggregate working quantity.

At block 914, the example component balancing module 522 calculates an updated component quantity for the selected exchange (e.g., the first exchange E1) based on the current aggregate working quantity (e.g., 50 shares). For example, by applying Equation 2 to the above values and with reference to the fourth row of the Table 4, the updated component quantity for the first exchange is 33 shares.

$$\begin{aligned} ComponentQuantity_{E1} &= ComponentPercent_{E1} * \quad \text{Equation 2} \\ & \quad AggWorking \\ &= (65\%) * (50 \text{ shares}) \\ &= 33 \text{ shares} \end{aligned}$$

At block 916, the example component balancing module 522 determines whether there is another exchange 506 for which to calculate an updated component quantity. If, at block 916, the example component balancing module 522 determined that there is another exchange for which to calculate an updated component quantity, then control returns to block 910 to select an unprocessed exchange (e.g., the example third exchange E3).

With reference to the Table 4, the example fourth and fifth rows illustrate the updated working order quantities allocated to the exchanges E1, E2 and E3 and the final allocation of the shares when the updated aggregated order is filled. For example, the fourth row of the Table 4 illustrates that the updated component quantities allocated to the exchanges E1, E2, E3 is 33 shares, 0 shares and 17 shares, respectively. Furthermore, the example fifth row of the Table 4 illustrates when all 100 shares of the updated aggregated order are purchased by the exchanges E1, E2, E3, the first exchange E1 purchased a total of 25 shares (e.g., 9 shares filled at the partial fill point plus 33 shares when the second exchange E2 component quantity was updated), the second exchange E2 purchased a total of 35 shares (e.g., 35 shares filled at the partial fill point plus zero (0) shares when the second exchange E2 component quantity was updated) and the third exchange E3 purchased a total of 23 shares (e.g., 6 shares filled at the partial fill point plus 17 shares when the third exchange E3 component quantity was updated).

If, at block 916, the example component balancing module 522 determined there was not another exchange to process (e.g., after the example exchanges E1, E2, E3 have been processed in the above example), the example program 900 of FIG. 9 ends. For example, control may return to block 812 of FIG. 8 to determine whether there is another exchange to process.

An example benefit of applying either approach of the first example re-balancing strategy is speed in calculation.

For example, the component balancing module is able to determine the updated component quantities by performing relatively simple calculations. As a result, the updated component quantities can be provided to the respective exchanges in a relatively short amount of time without slowing down the updating of component quantities. For example, the fixed percentage allocations are known to the component balancing module 522 before an updated aggregated order is determined and the exchanges already provide fill data (e.g., data relating to one or more fills of trade orders) that can be used to calculate the updated component quantities.

In contrast to the first example approach (e.g., applying a fixed percentage allocation to a current aggregated worked order quantity), the second example approach (e.g., applying a fixed percentage allocation to an updated aggregated order quantity) attempts to make sure that, regardless of the change in quantity, the final fill quantities are distributed across the exchanges according to the initial fixed percentage allocation (e.g., at a 60/40 ratio in the above example). For example, based on the results in the Table 3, when the updated aggregated order is filled, the first exchange E1 filled 132 of the 220 shares (e.g., 60% of the 220 shares) and the second exchange E2 filled 88 of the 220 shares (e.g., 40% of the 220 shares). While the first example approach does not necessarily result in the final fill quantities distributed across the exchanges according to the initial fixed percentage allocation, the updated working order quantities allocated to the exchanges corresponds to the fixed percentage allocation. For example, based on the results in the Table 2, when the updated working order quantities are calculated, the quantities are distributed in accordance with the fixed percentage allocation (e.g., the first exchange is allocated 66 shares of an aggregated working order quantity of 110 shares (e.g., 60%) and the second exchange is allocated 44 shares of the aggregated working order quantity (e.g., 40%)). However, the final fill quantities do not represent the initial fixed percentage allocations (e.g., the first exchange E1 filled 106 of the 220 shares (e.g., 48%) and the second exchange E2 filled 114 of the 220 shares (e.g., 52%)).

B. An Example Re-Balancing Strategy Based on Position Information

Figure 10:
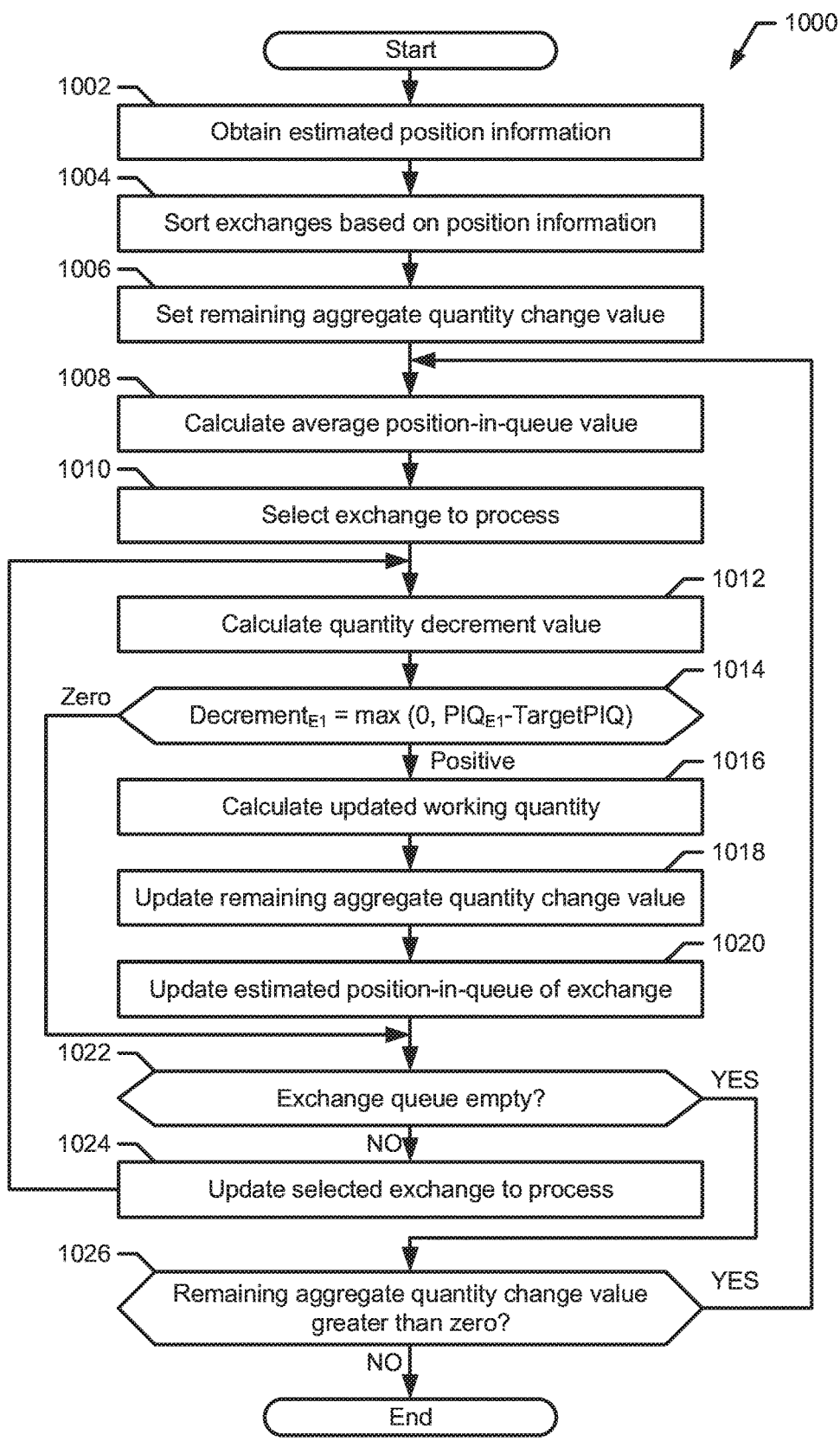
FIG. 10 is a flow diagram illustrative of machine readable instructions that may be executed to implement the example component balancing module of FIG. 5 to employ an aggregated order quantity modification strategy based on position information.

FIG. 10 illustrates an example of trade order quantify modification based on an estimated position-in-queue of components of the aggregated order at respective exchanges. FIG. 10 is a flowchart representative of machine readable instructions that may be executed to implement the example component balancing module 522 of FIG. 5. In the illustrated example, an example program 1000 operates to minimize an aggregate estimated position-in-queue of the aggregated order 510 when updating component quantities between the different exchanges when the change in quantity is negative (e.g., the updated aggregated order quantity is less than the initial aggregated order quantity). For example, the program 1000 of FIG. 10 modifies the quantity of the worst position-in-queue until either there are no more remaining orders to remove or the currently processed exchange is no longer the worst position-in-queue. In the illustrated example, the working quantity value represents the number of contracts for tradeable objects that must be traded at the exchange prior to the corresponding component being filled. For example, if an exchange is allocated a component quantity of three and the trade order is second-in-line at the exchange, then the working quantity for the component is four (e.g., three from the component order and one from the quantity (or quantities) to be completed before the trade order). In the illustrated example, the program 1000 of FIG. 10 may be used to implement block 610 of the example program 600 of FIG. 6.

The example program 1000 of FIG. 10 begins at block 1002 when the example component balancing module 522 obtains position information for components at the exchanges 506. For example, the component balancing module 522 may request (e.g., via the example communication module 524 (FIG. 5)) the position-in-queue of the component at each of the respective exchanges. In some examples, the component balancing module 522 may utilize exact position-in-queue (PIQ) information provided by an exchange. In other examples, the component balancing module 522 may utilize an estimated position-in-queue (EPIQ). An example method of determining the EPIQ is described in U.S. Pat. No. 7,809,628, entitled "System and Method for Estimating Order Position," filed on May 30, 2003, and which is hereby incorporated by reference herein. At block 1004, the example component balancing module 522 sorts the exchanges 506 based on their respective position information. For example, the component balancing module 522 may generate a sorted exchange queue based on decreasing estimated position-in-queue values.

Figure 11:
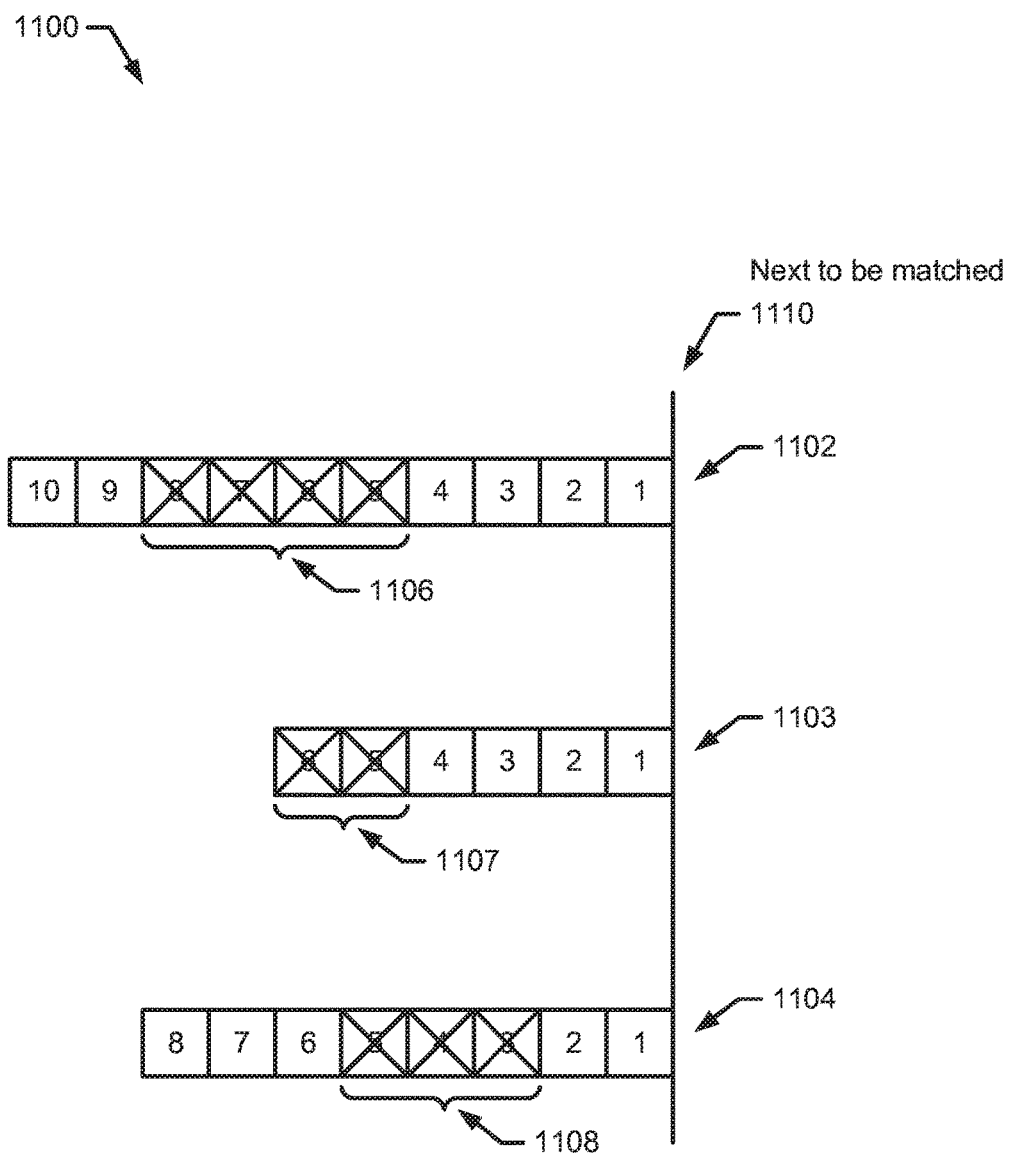
FIGS. 11-14 are graphical representations of estimated position-in-queue of components at respective exchanges.

FIG. 11 is a graphical representation 1100 of the position-in-queue for three components traded at respective exchanges. In the illustrated example of FIG. 11, three example exchanges 1102, 1103, 1104 are sorted in decreasing position-in-queue. A first component 1106 is allocated to a first exchange 1102. The example first component 1106 represents a quantity of four and is eighth in queue for execution by the first exchange 1102. In the illustrated example, the positions of each component (including the individual tradeable objects) are known, but in the absence of information from the exchange the positions may be estimated by accounting for the placement of new orders and fills at an exchange. A second component 1107 is allocated to a second exchange 1103. The example second component 1107 represents a quantity of two and is estimated to be sixth in queue for execution by the second exchange 1103. A third component 1108 is allocated to a third exchange 1104. The example third component 1108 represents a quantity of three and is estimated to be fifth in queue for execution by the third exchange 1104. In the illustrated example, the components 1106, 1107, 1108 resting at the respective exchanges 1102, 1103, 1104 are matched based on their proximity to the front of the queues 1110 such that orders closer to the front of the queue 1110 are matched before orders that are farther from the queue. For example, the order identified with reference numeral 10 working at exchange 1102 is the last to be matched because it is further from the front of the queue 1110. The example components 1106, 1107, 1108 represent three components of an aggregated order (e.g., the example aggregated order 510 of FIG. 5). For example, by summing the quantities of the three components 1106 (4), 1107 (2) and 1108 (3), the quantity of the aggregated order 510 can be determined (e.g., 4+2+3=9). The example graphical representation 1100 illustrates the components of an initial aggregated order 510 with a quantity of nine.

Returning to the example program 1000 of FIG. 10, at block 1006, the example component balancing module 522 sets a remaining aggregate quantity change ("RemainingAggQuantityChange") value based on the change in quantity from an initial aggregated order quantity. For example, consider an example in which the component balancing module 522 determines an updated aggregated order having a quantity of five (e.g., a decrease in quantity of four).

At block 1008, the example component balancing module 522 calculates an average position-in-queue ("TargetPIQ")

value of the aggregated order 510 based on the estimated position-in-queue of the components at the respective exchanges. For example, the component balancing module 522 may utilize Equation 5 to calculate the average position-in-queue of the aggregated order 510.

$$TargetPIQ = \frac{1}{MaxComponents} \sum_{nE=1}^{MaxComponents} PIQ_{nE} \quad \text{Equation 5}$$

In the example Equation 5, the "TargetPIQ" variable represents the average position-in-queue of the aggregated order 510. The "MaxComponents" variable represents the number of exchanges that are allocated quantities in the initial aggregated order 510. For example, the "MaxComponents" variable may be determined based on the number of exchanges that provided position information at block 1002. With reference to the example graphical representation 1100 of FIG. 11, the "MaxComponents" variable is three. The example "$PIQ_{nE}$" variable represents the position-in-queue of the component at the respective exchange. For example, the position-in-queue of the first component 1106 at the first exchange 1102 is eight, the position-in-queue of the second component 1107 at the second exchange 1103 is six and the position-in-queue of the third component 1108 at the third exchange 1104 is five. By applying Equation 5 to the above values at block 1008, the TargetPIQ can be calculated:

$$TargetPIQ = \frac{1}{3} \sum_{nE=1}^{3} PIQ_{nE}$$
$$= \frac{1}{3} * (8 + 6 + 5) = \frac{19}{3} \approx 6.3$$

At block 1010, the example component balancing module 522 selects a component to process. For example, the component balancing module 522 selects the first component (e.g., the example component 1106) in the sorted exchanges queue (determined at block 1004). At block 1012, the example component balancing module 522 calculates a quantity decrement ("$Decrement_j$") value for the selected component based on the position-in-queue of the component and the calculated average position-in-queue value (e.g., the "TargetPIQ" value). For example, the component balancing module 522 may utilize Equation 6 to calculate the quantity decrement for the first component 1106.

$$Decrement_{E1} = \max(0, PIQ_{E1} - TargetPIQ) \quad \text{Equation 6}$$
$$= \max(0, 8 - 6) = 2$$

At block 1014, the component balancing module 522 returns either zero or a positive value for the quantity decrement value at the selected exchange (e.g., 2). If the difference between the position-in-queue and the target position-in-queue is negative, the component balancing module 522 returns a value of zero. If, at block 1014, the component balancing module 522 determined that the quantity decrement value is zero, then control proceeds to block 1022 to determine whether there is another exchange in the sorted exchange queue to process.

If, at block 1014, the example component balancing module 522 determined that the quantity decrement value (e.g., 2) is a positive number greater than zero, then, at block 1016, the example component balancing module 522 calculates an updated working quantity ("$WorkingQty_j$") for the selected exchange (e.g., the first exchange 1102). For example, the component balancing module 522 may set the updated working quantity based on the difference of the previous working quantity value (e.g., 8) and the quantity decrement value ("$Decrement_j$") for the selected exchange (e.g., 2). At block 1018, the example component balancing module 522 updates the remaining aggregate quantity change value ("RemainingAggQuantityChange") based on a difference of the quantity decrement value (e.g., 2) from the current remaining aggregate quantity change value (e.g., 4). For example, the component balancing module 522 updates the remaining aggregate quantity change value to two based on the current remaining aggregate quantity change value (e.g., 4) and the quantity decrement value (e.g., 2). At block 1020, the example component balancing module 522 updates the estimated position-in-queue of the component (e.g., the first component 1106) at the selected exchange (e.g., the first exchange 1102) based on the quantity decrement value (e.g., 2). For example, the component balancing module 522 calculates the updated estimated position-in-queue of the first component 1106 at the first exchange 1102 based on a difference of the quantity decrement value (e.g., 2) from the current position-in-queue of the first component 1106 at the first exchange 1102.

Figure 12:
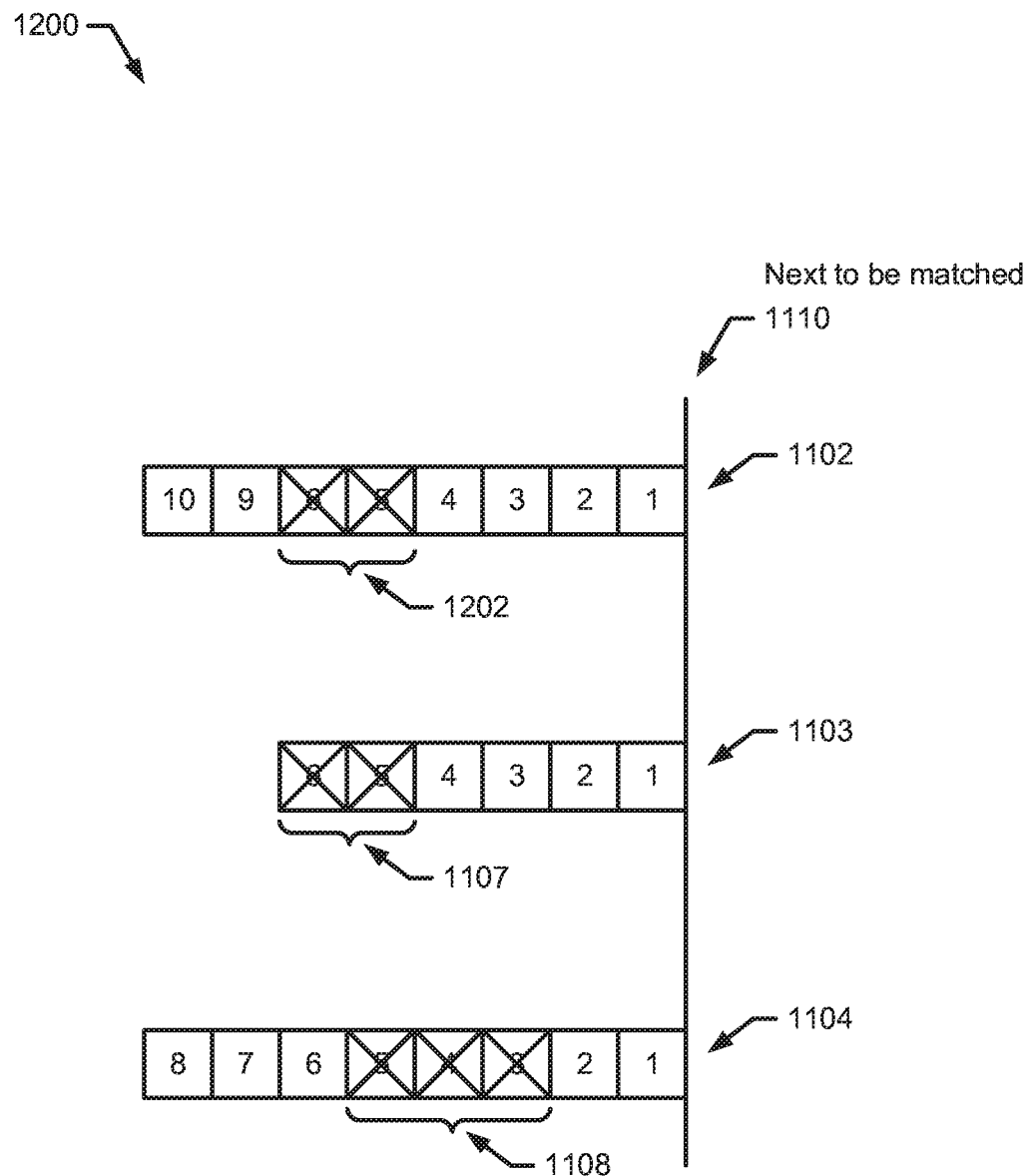

FIG. 12 is an updated graphical representation 1200 depicting the position-in-queue of the components 1106, 1107, 1108 at the respective exchanges 1102, 1103, 1104 in response to updating the position-in-queue of the first component 1106 at the first exchange 1102. In the illustrated example of FIG. 12, example component 1202 represents the first component 1106 of FIG. 11 after updating the quantity of the first component 1106 by decreasing the quantity by two.

Returning to the example program 1000 of FIG. 10, at block 1022, the example component balancing module 522 determines whether the sorted exchange queue is empty. For example, the component balancing module 522 may determine whether the exchange queue includes an unprocessed exchange. If, at block 1022, the example component balancing module 522 determined that the sorted exchange queue was not empty, then, at block 1024, the component balancing module 522 updates the selected exchange to the next exchange in the sorted exchange queue (e.g., the second example exchange 1103). Control then returns to block 1012 to calculate the quantity decrement value for the second example exchange 1103.

If, at block 1022, the example component balancing module 522 determined that the sorted exchange queue was empty, then, at block 1026, the component balancing module 522 determines whether the remaining aggregate quantity change value ("RemainingAggQuantityChange") is greater than zero. If, at block 1026, the position component balancing module 522 determined that the remaining aggregate quantity change value is greater than zero, then control returns to block 1008 to calculate an updated average position-in-queue of the aggregated order 510 at the exchanges 1102, 1103, 1104. Otherwise, the example program 1000 of FIG. 10 ends.

In the illustrated example, returning to block 1012 during the second iteration of the program 1000, the example component balancing module 522 calculates a quantity decrement ("$Decrement_j$") value for the second component 1107 at the second exchange 1103 based on the position-in-queue of the second component (e.g., six) and the calculated average position-in-queue value (e.g., the "TargetPIQ" value (6)). For example, the component balancing module 522 may utilize Equation 6 to calculate the quantity decrement for the second component 1107.

$$Decrement_{E2} = \max(0, PIQ_{E2} - TargetPIQ) \quad \text{Equation 6}$$
$$= \max(0, 6-6) = 0$$

At block 1014, the component balancing module 522 determines whether the quantity decrement value for the selected exchange (e.g., 0) is greater than zero. For example, in the illustrated example, at block 1014, the component balancing module 522 determined that the quantity decrement value was not greater than zero (e.g., Decrement$_{E2}$ value (e.g., 0) is less than or equal to zero), then control proceeds to block 1022 to determine whether there is another exchange in the sorted exchange queue to process.

At block 1022, the example component balancing module 522 determines whether the sorted exchange queue is empty. For example, the component balancing module 522 may determine whether the exchange queue includes an unprocessed exchange. In the illustrated example, at block 1022, the example component balancing module 522 determines that the sorted exchange queue was not empty, then, at block 1024, the component balancing module 522 updates the selected exchange to the next exchange in the sorted exchange queue (e.g., the third example exchange 1104). Control then returns to block 1012 to calculate the quantity decrement value for the third example exchange 1104.

Returning to block 1012 during the third iteration of the program 1000, the example component balancing module 522 calculates a quantity decrement ("Decrement$_j$") value for the third component 1108 at the third exchange 1104 based on the position-in-queue of the third component (e.g., five) and the calculated average position-in-queue value (e.g., the "TargetPIQ" value (6)). For example, the component balancing module 522 may utilize Equation 6 to calculate the quantity decrement for the third component 1108.

$$Decrement_{E3} = \max(0, PIQ_{E3} - TargetPIQ) \quad \text{Equation 6}$$
$$= \max(0, 5-6) = -1$$

At block 1014, the component balancing module 522 determines whether the quantity decrement value for the selected exchange (e.g., -1) is greater than zero. For example, in the illustrated example, at block 1014, the component balancing module 522 determines that the quantity decrement value was not greater than zero (e.g., Decrement$_{E3}$ value (e.g., -1) is less than or equal to zero), then control proceeds to block 1022 to determine whether there is another exchange in the sorted exchange queue to process.

At block 1022, the example component balancing module 522 determines whether the sorted exchange queue is empty. For example, the component balancing module 522 may determine whether the exchange queue includes an unprocessed exchange. In the illustrated example, at block 1022, the example component balancing module 522 determines that the sorted exchange queue is empty, then, at block 1026, the component balancing module 522 determines whether the remaining aggregate quantity change value ("RemainingAggQuantityChange") is greater than zero. If, at block 1026, the position component balancing module 522 determined that the remaining aggregate quantity change value is greater than zero, then control returns to block 1008 to calculate an updated average position-in-queue of the aggregated order 510 at the exchanges 1102, 1103, 1104.

In the illustrated example, returning to block 1008 during a subsequent iteration, the example component balancing module 522 calculates an updated average position-in-queue ("TargetPIQ") value of the aggregated order 510 based on the position-in-queue of the components at the respective exchanges. For example, the component balancing module 522 may utilize Equation 5 to calculate the average position-in-queue of the aggregated order 510.

$$TargetPIQ = \frac{1}{MaxComponents} \sum_{nE=1}^{MaxComponents} PIQ_{nE} \quad \text{Equation 5}$$
$$= \frac{1}{3} \sum_{nE=1}^{3} PIQ_{nE}$$
$$= \frac{1}{3} * (6+6+5) = \frac{17}{3} \approx 5.6$$

At block 1010, the example component balancing module 522 selects a component to process. For example, the component balancing module 522 selects the first component (e.g., the example component 1202) in the sorted exchanges queue. At block 1012, the example component balancing module 522 calculates a quantity decrement ("Decrement$_j$") value for the first component 1106 based on the position-in-queue of the first component 1106 (e.g., 6) and the calculated average position-in-queue value (e.g., the "TargetPIQ" value (e.g., 5)). For example, the component balancing module 522 may utilize Equation 6 to calculate the quantity decrement for the first component 1202.

$$Decrement_{E1} = \max(0, PIQ_{E1} - TargetPIQ) \quad \text{Equation 6}$$
$$= \max(0, 6-5) = 1$$

At block 1014, the component balancing module 522 determines whether the quantity decrement value for the selected exchange (e.g., 1) is greater than zero. In the illustrated example, at block 1014, the example component balancing module 522 determines that the quantity decrement value (e.g., 1) was greater than zero, then, at block 1016, the example component balancing module 522 calculates an updated working quantity ("WorkingQty$_j$") for the selected exchange (e.g., the first exchange 1102). For example, the component balancing module 522 may set the updated working quantity based on the difference of the previous working quantity value (e.g., 6) and the quantity decrement value ("Decrement$_j$") for the selected exchange (e.g., 1). At block 1018, the example component balancing module 522 updates the remaining aggregate quantity change value ("RemainingAggQuantityChange") based on a difference of the quantity decrement value (e.g., 1) from the current remaining aggregate quantity change value (e.g., 2). For example, the component balancing module 522 updates the remaining aggregate quantity change value to one based on the current remaining aggregate quantity change value (e.g., 2) and the quantity decrement value (e.g., 1). At block 1020, the example component balancing module 522 updates the position-in-queue of the component (e.g., the first component 1202) at the selected exchange (e.g., the first exchange 1102) based on the quantity decrement value (e.g., 1). For example, the component balancing module 522 calculates the updated position-in-queue of the first component 1202 at the first exchange 1102 based on a difference of the quantity decrement value (e.g., 1) from the current position-in-queue of the first component 1202 at the first exchange 1102.

Figure 13:
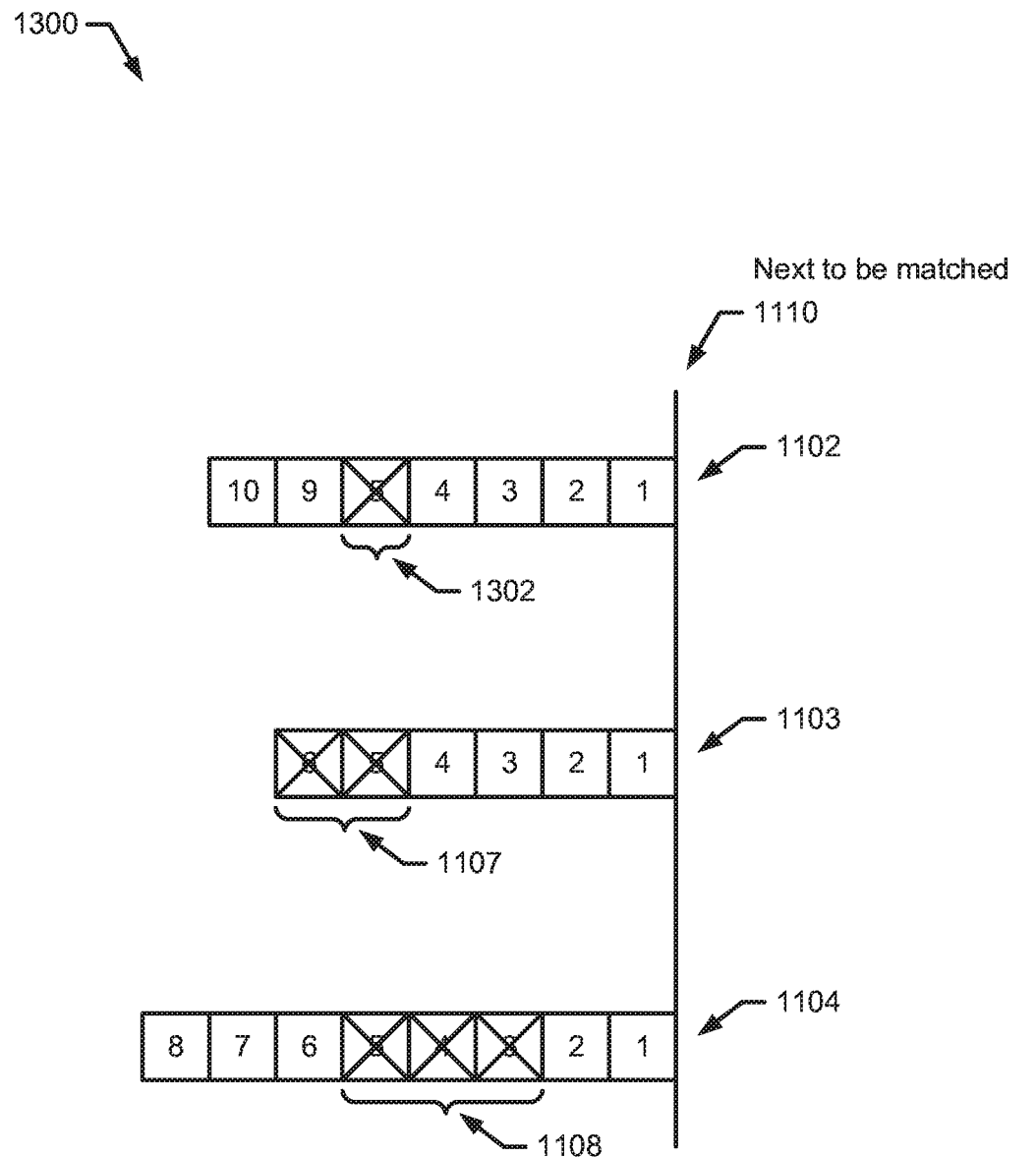

FIG. 13 is an updated graphical representation 1300 of position-in-queue of the components 1202, 1107, 1108 at the respective exchanges 1102, 1103, 1104 in response to updating the position-in-queue of the first component 1202 at the first exchange 1102. The example component 1302 represents the first component 1202 of FIG. 12 after updating the quantity of the first component 1202 by decreasing the quantity (e.g., 2) by one.

Returning to the example program 1000 of FIG. 10, at block 1022, the example component balancing module 522 determines whether the sorted exchange queue is empty. For example, the component balancing module 522 may determine whether the exchange queue includes an unprocessed exchange. If, at block 1022, the example component balancing module 522 determined that the sorted exchange queue was not empty, then, at block 1024, the component balancing module 522 updates the selected exchange to the next exchange in the sorted exchange queue (e.g., the second example exchange 1103). Control then returns to block 1012 to calculate the quantity decrement value for the second example exchange 1103.

Figure 14:
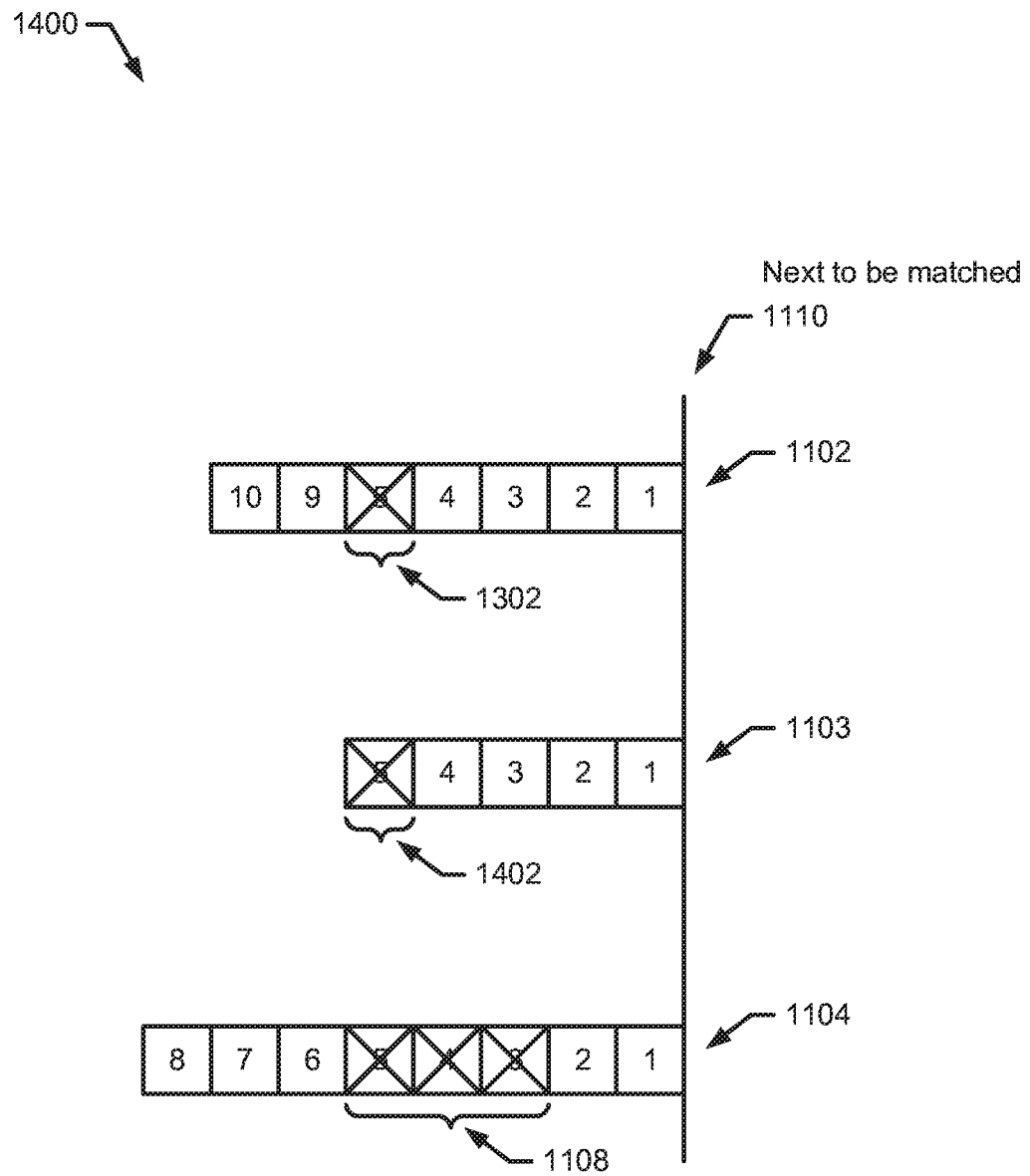

Continuing through the iterations, FIG. 14 is an updated graphical representation 1400 of position-in-queue of the components 1302, 1107, 1108 at the respective exchanges 1102, 1103, 1104 in response to updating the estimated position-in-queue of the components 1302, 1107, 1108 at the exchanges 1102, 1103, 1104. The example component 1402 represents the second component 1107 of FIGS. 11, 12 and/or 13 after updating the quantity of the second component 1107 by decreasing the quantity (e.g., 1) by one. The graphical representation 1400 illustrates the updated position-in-queue of the components of the initial aggregated order 510 after the change in quantity (e.g., 4) was executed. For example, the sum of the components 1302, 1402, 1108 in FIG. 14 (e.g., five) is the same as the updated aggregated order quantity (e.g., 5).

In addition, the example program 1100 of FIG. 11 facilitates decreasing quantities from a modified aggregated order without sacrificing advantageous position-in-queues at the exchanges. For example, when the modification is a negative change in quantity, the example component balancing module 522 facilitates adjusting quantities that are further from the front of the queue rather than closer to the front of the queue. For example, it is generally preferred to sacrifice a position-in-queue at an exchange where the component is second-to-last in the queue rather than when the component is next-in-line to be filled at the exchange.

In some instances, the component balancing module 522 may receive a request to increase a quantity for a trade order resting at an exchange. However, according to many exchanges, if a request to modify a trade order increases the quantity of the trade order, then the trade order loses its position-in-queue at the exchange and is moved to the back of the queue. Thus, it is beneficial to consider position-in-queue when increasing a quantity. For example, it is more advantageous to, when increasing quantity, to increase the quantity of the trade order(s) with the worst position-in-queue (e.g., the deepest estimated position-in-queue) and furthest from being filled. When modifying an aggregated order to increase quantity of the aggregated order, the component balancing module 522 may attempt to optimize the position-in-queue (PIQ) of each component in order to to minimize the overall PIQ across the components of the aggregated order.

Figure 15:
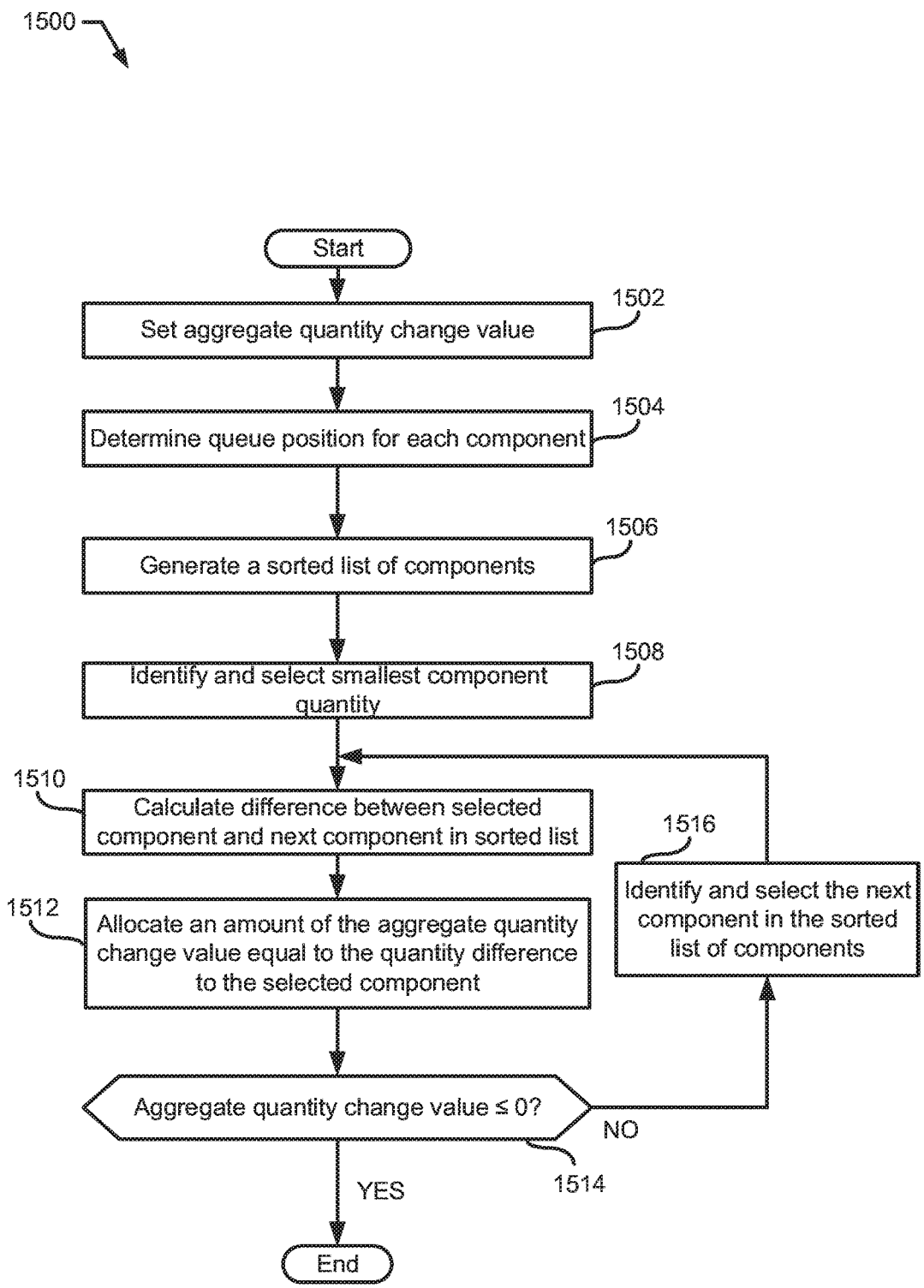
FIG. 15 is a flow diagram illustrative of machine readable instructions that may be executed to implement the example component balancing module of FIG. 5 to employ an aggregated order quantity modification strategy based on position information Certain embodiments will be better understood when read in conjunction with the provided figures, which illustrate examples. It should be understood, however, that the embodiments are not limited to the arrangements and instrumentality shown in the attached figures.

FIG. 15 is a flowchart representative of machine readable instructions that may be executed to implement the example component balancing module 522 of FIG. 5. In the illustrated example, an example program 1500 operates to minimize an overall position-in-queue of the aggregated order 510 when increasing the total component quantities allocated between the different exchanges, legs, and/or tradeable objects (e.g., the updated aggregated order quantity is greater than the initial aggregated order quantity). In operation, the program 1500 of FIG. 15 modifies the component quantity of one or more components in order to minimize the overall position-in-queue of components that make up the aggregated order 510. The program 1500 iterates through each of the components of the aggregated order 510 until the component quantity increased between the components is equal to or greater than the aggregated quantity change value between the initial aggregated order quantity and the updated aggregated order quantity. In the illustrated example, when modifying the component quantity of two or more components of the aggregated order 510 would result in substantially the same position-in-queue, the example component balancing module 522 divides and allocates the increased quantities between the two or more components. In some examples, the component balancing module 522 may not increase the quantity of one or more of the components of the aggregated order 510. For example, based on their relative sizes and the difference between the two component quantities, the example component balancing module 522 may determine not to increase one or more of the component quantities. In the illustrated example, the program 1500 of FIG. 15 may be used to implement block 610 of the example program 600 of FIG. 6.

The example program 1500 of FIG. 15 begins at block 1502 when the component balancing module 522 sets an aggregate quantity change value based on the desired increase quantity with respect to an initial aggregated order quantity. At block 1504, the component balancing module 522 identifies the queue position for each component working at the exchanges 506. In certain embodiments, position-in-queue information may be provided to the component balancing module 522 by the respective exchanges. In certain embodiments, position-in-queue information may be estimated. An estimated position-in-queue (EPIQ) may be determined as described in U.S. Pat. No. 7,809,628, entitled "System and Method for Estimating Order Position," filed on May 30, 2003, and which is hereby incorporated by reference herein.

At block 1506, the individual components of the aggregated order 510 are sorted according to quantity by the component balancing module 522. For example, the component balancing module 522 may generate a list of components sorted according to increasing quoted quantities working at the exchanges 506. In certain embodiments, the list of components may be sorted and arranged based on position-in-queue information. For example, the component balancing module 522 may arrange components based on a determined likelihood of a fill in any one of the components of the aggregated order 510. A list of components sorted according to position-in-queue may arrange components in an ascending order to indicate the likelihood of a fill. At block 1508, the component balancing module 522 identifies and selects the component having the smallest quantity. For example, the component balancing module 522 retrieves an identifier of the first component in the sorted list of components. At block 1510, the component balancing module 522 determines a quantity difference between the identified component and the next component in the sorted list. The determined quantity difference describes the quantity amount that the selected component can be increased. At block 1512, the component balancing module 522 allocates all or a portion of the aggregate quantity change value equal to the determined quantity difference to the identified component. In this way, the quantity of the identified and selected components can be increased to equal the quantity of the next component (i.e., the component used to calculate the difference quantity) in the sorted list of components. At block 1514, the component balancing module 522 determines if the desired quantity associated with the aggregate quantity change value has been allocated to increase the initial aggregated order quantity. If the entire aggregate quantity change value has been allocated, then the program 1500 ends. However, if there remains quantity associated with the aggregate quantity change value that must be allocated, control of the program 1500 passes to block 1516.

At block 1516, the component balancing module 522 identifies and selects the next component in the sorted list of component compiled at block 1506. Upon identification and selection of the next components from the sorted list of components, control of the program 1500 returns to block 1510. At block 1510, the difference quantity is once again determined between components arranged by ascending quantity in the sorted list of components. In the present example, multiple components (e.g., the first and second components in the sorted list) may have substantially the same difference quantity with respect to the third component (e.g., the next component in the sorted list). When multiple components are associated with the same, or substantially the same, quantity difference, the component balancing module 522 may allocate the aggregate quantity change value evenly between the components at block 1512. This process may iterate until the entire aggregate quantity change value has been allocated across the components in the sorted list and the desired quantity increase has been realized.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method for executing a trade order in a trading system including a plurality of electronic exchanges, the method comprising:
   receiving, via a processor of a computing device, a first request to trade a first trade order quantity of a tradeable object;
   receiving, via the processor, a second request to trade a second trade order quantity of the tradeable object;
   determining, via the processor, an aggregated order having an initial aggregated order quantity based on the first trade order quantity and the second trade order quantity;
   allocating, using the processor, a first component quantity to a first electronic exchange based on the initial aggregated order quantity and a first allocation percentage associated with the first electronic exchange and allocating, using the processor, a second component quantity to a second electronic exchange based on the initial aggregated order quantity and a second allocation percentage associated with the second electronic exchange;
   in response to allocating the first component quantity and the second component quantity, submitting a first order for the first component quantity to the first electronic exchange and a second order for the second component quantity to the second electronic exchange;
   in response to a request to modify a trade order quantity associated with the tradeable object, calculating an updated aggregated order quantity based on the initial aggregated order quantity and the trade order quantity;
   obtaining first market data representing a quantity of the first component quantity filled by the first electronic exchange and obtaining second market data representing a quantity of the second component quantity filled by the second electronic exchange;

calculating an updated first component quantity based on the updated aggregated order quantity, the first allocation percentage and the first market data and calculating an updated second component quantity based on the updated aggregated order quantity, the second allocation percentage and the second market data; and in response to calculating the updated first component quantity and the updated second component quantity, submitting at least one of a first modified order based on the updated first component quantity to the first electronic exchange and a second modified order for the second component quantity to the second electronic exchange.

2. The method of claim 1, further including comparing the updated first component quantity to a threshold.

3. The method of claim 2, wherein, in response to determining that the updated first component quantity fails to satisfy the threshold, calculating the updated first component quantity including modifying the first component quantity based on the first component quantity and the first market data.

4. The method of claim 3, wherein calculating the updated second component quantity includes:
calculating a modified aggregated order quantity based on the updated aggregated order quantity and the first market data;
calculating a third allocation percentage associated with the second electronic exchange based on the first allocation percentage and the second allocation percentage; and
calculating a third component quantity to provide to the second electronic exchange based on the modified aggregated order quantity and the third allocation percentage.

5. The method of claim 1, wherein calculating the updated first component quantity includes processing the difference between the first market data and a modified component quantity based on the updated aggregated order quantity and the first allocation percentage.

6. The method of claim 1, wherein the updated first component quantity corresponds to the first allocation percentage of the updated aggregated order quantity and the updated second component quantity corresponds to the second allocation percentage of the updated aggregated order quantity.

7. A system comprising:
a computing device, including a processor to execute a trade order in a trading system including a plurality of electronic exchanges, wherein the computing device is to:
receive a first request to trade a first trade order quantity of a tradeable object;
receive a second request to trade a second trade order quantity of the tradeable object;
determine an aggregated order having an initial aggregated order quantity based on the first trade order quantity and the second trade order quantity;
allocate a first component quantity to a first electronic exchange based on an initial aggregated order quantity and a first allocation percentage associated with the first electronic exchange and allocate a second component quantity to a second electronic exchange based on the initial aggregated order quantity and a second allocation percentage associated with the second electronic exchange;
in response to allocating the first component quantity and the second component quantity, submit a first order for the first component quantity to the first electronic exchange and a second order for the second component quantity to the second electronic exchange;
in response to a request to modify a trade order quantity associated with the tradeable object, calculate an updated aggregated order quantity based on the initial aggregated order quantity and the trade order quantity;
obtain first market data representative of a quantity of the first component quantity filled by the first electronic exchange and second market data representative of a quantity of the second component quantity filled by the second electronic exchange;
calculate an updated first component quantity based on the updated aggregated order quantity, the first allocation percentage and the first market data and an updated second component quantity based on the updated aggregated order quantity, the second allocation percentage and the second market data; and
in response to calculating the updated first component quantity and the updated second component quantity, submit at least one of a first modified order based on the updated first component quantity to the first electronic exchange and a second modified order for the second component quantity to the second electronic exchange.

8. The system of claim 7, wherein the computing device is to compare the updated first component quantity to a threshold.

9. The system of claim 8, wherein, in response to a determination that the updated first component quantity fails to satisfy the threshold, the computing device is to calculate the updated first component quantity by modifying the first component quantity based on the first component quantity and the first market data.

10. The system of claim 9, wherein the computing device is to calculate the updated second component quantity by:
calculating a modified aggregated order quantity based on the updated aggregated order quantity and the first market data;
calculating a third allocation percentage associated with the second electronic exchange based on the first allocation percentage and the second allocation percentage; and
calculating a third component quantity to provide to the second electronic exchange based on the modified aggregated order quantity and the third allocation percentage.

11. The system of claim 7, wherein the computing device is to calculate the updated first component quantity by processing the difference between the first market data and a modified component quantity based on the updated aggregated order quantity and the first allocation percentage.

12. The system of claim 7, wherein the updated first component quantity is to correspond to the first allocation percentage of the updated aggregated order quantity and the updated second component quantity is to correspond to the second allocation percentage of the updated aggregated order quantity.

13. A tangible computer readable storage medium comprising instructions that, when executed, cause a computing device to at least:
receive a first request to trade a first trade order quantity of a tradeable object;
receive a second request to trade a second trade order quantity of the tradeable object;

determine an aggregated order having an initial aggregated order quantity based on the first trade order quantity and the second trade order quantity;

allocate a first component quantity to a first electronic exchange based on an initial aggregated order quantity and a first allocation percentage associated with the first electronic exchange and allocate a second component quantity to a second electronic exchange based on the initial aggregated order quantity and a second allocation percentage associated with the second electronic exchange;

in response to allocating the first component quantity and the second component quantity, submit a first order for the first component quantity to the first electronic exchange and a second order for the second component quantity to the second electronic exchange;

in response to a request to modify a trade order quantity associated with the tradeable object, calculate an updated aggregated order quantity based on the initial aggregated order quantity and the trade order quantity;

obtain first market data representative of a quantity of the first component quantity filled by the first electronic exchange and second market data representative of a quantity of the second component quantity filled by the second electronic exchange;

calculate an updated first component quantity based on the updated aggregated order quantity, the first allocation percentage and the first market data and an updated second component quantity based on the updated aggregated order quantity, the second allocation percentage and the second market data; and in response to calculating the updated first component quantity and the updated second component quantity, submit at least one of a first modified order based on the updated first component quantity to the first electronic exchange and a second modified order for the second component quantity to the second electronic exchange.

14. The tangible computer readable storage medium of claim 13, wherein the instructions cause the computing device to:
compare the updated first component quantity to a threshold; and
in response to a determination that the updated first component quantity fails to satisfy the threshold, calculate the updated first component quantity by modifying the first component quantity based on the first component quantity and the first market data.

15. The tangible computer readable storage medium of claim 14, wherein the instructions cause the computing device to calculate the updated second component quantity by:
calculating a modified aggregated order quantity based on the updated aggregated order quantity and the first market data;
calculating a third allocation percentage associated with the second electronic exchange based on the first allocation percentage and the second allocation percentage; and
calculating a third component quantity to provide to the second electronic exchange based on the modified aggregated order quantity and the third allocation percentage.

16. The tangible computer readable storage medium of claim 13, wherein the instructions cause the computing device to calculate the updated first component quantity by processing the difference between the first market data and a modified component quantity based on the updated aggregated order quantity and the first allocation percentage.

17. The tangible computer readable storage medium of claim 13, wherein the updated first component quantity is to correspond to the first allocation percentage of the updated aggregated order quantity and the updated second component quantity is to correspond to the second allocation percentage of the updated aggregated order quantity.

* * * * *